US011294184B2

(12) United States Patent
Lu et al.

(10) Patent No.: US 11,294,184 B2
(45) Date of Patent: Apr. 5, 2022

(54) FOVEATED DISPLAY SYSTEM

(71) Applicant: FACEBOOK TECHNOLOGIES, LLC, Menlo Park, CA (US)

(72) Inventors: Lu Lu, Kirkland, WA (US); Gang Li, Bothwell, WA (US); Seungjae Lee, Redmond, WA (US); Mengfei Wang, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/735,409

(22) Filed: Jan. 6, 2020

(65) Prior Publication Data
US 2021/0208397 A1  Jul. 8, 2021

(51) Int. Cl.
*G02B 27/01* (2006.01)
*G02B 27/00* (2006.01)
*G06F 3/01* (2006.01)

(52) U.S. Cl.
CPC ..... *G02B 27/0172* (2013.01); *G02B 27/0093* (2013.01); *G02B 27/0179* (2013.01); *G06F 3/013* (2013.01); *G02B 2027/014* (2013.01); *G02B 2027/0123* (2013.01); *G02B 2027/0138* (2013.01); *G02B 2027/0147* (2013.01); *G02B 2027/0187* (2013.01)

(58) Field of Classification Search
None
See application file for complete search history.

(56) References Cited

U.S. PATENT DOCUMENTS

| 5,682,212 A * | 10/1997 | Maurer ............... G02B 5/3016 349/5 |
| 7,167,308 B1 | 1/2007 | Krishnamurthy et al. |
| 7,522,344 B1 * | 4/2009 | Curatu ............... G02B 27/0093 359/634 |
| 2006/0082691 A1 | 4/2006 | Tanijiri |

(Continued)

FOREIGN PATENT DOCUMENTS

WO  2018/160146 A1  9/2018

OTHER PUBLICATIONS

International Search Report and Written Opinion for International Application No. PCT/US2020/065925, dated Apr. 6, 2021, 9 Pages.

(Continued)

*Primary Examiner* — Matthew Yeung
(74) *Attorney, Agent, or Firm* — Artegis Law Group, LLP

(57) ABSTRACT

Various embodiments set forth a foveated display system and components thereof. The foveated display system includes a peripheral display module disposed in series with a foveal display module. The peripheral display module is configured to generate low-resolution, large field of view imagery for a user's peripheral vision. The foveal display module is configured to perform foveated rendering in which high-resolution imagery is focused towards a foveal region of the user's eye gaze. The peripheral display module may include a diffuser that is disposed within a pancake lens, which is a relatively compact design. The foveal display module may include a Pancharatnam-Berry Phase grating stack that increases the steering range of a beam-steering device such that a virtual image can be steered to cover an entire field of view visible to the user's eye.

20 Claims, 14 Drawing Sheets

(56) References Cited

U.S. PATENT DOCUMENTS

| | | | |
|---|---|---|---|
| 2007/0217018 A1* | 9/2007 | Fredriksson | G02B 27/0103 359/631 |
| 2009/0052838 A1 | 2/2009 | McDowall et al. | |
| 2009/0128901 A1* | 5/2009 | Tilleman | G02B 30/34 359/475 |
| 2011/0187993 A1* | 8/2011 | Fernandez | G02C 7/068 351/159.42 |
| 2011/0292346 A1* | 12/2011 | Fok | G03B 21/2013 353/13 |
| 2012/0242698 A1* | 9/2012 | Haddick | G02B 27/0176 345/633 |
| 2015/0253469 A1* | 9/2015 | Le Gros | G02B 3/0006 359/619 |
| 2015/0346495 A1* | 12/2015 | Welch | G06F 1/163 345/8 |
| 2016/0270656 A1* | 9/2016 | Samec | A61B 5/6803 |
| 2017/0082855 A1 | 3/2017 | Christmas et al. | |
| 2017/0227764 A1 | 8/2017 | Kim et al. | |
| 2018/0136468 A1* | 5/2018 | Son | G02B 5/0252 |
| 2019/0004325 A1* | 1/2019 | Connor | G02B 27/0172 |
| 2019/0043392 A1* | 2/2019 | Abele | G09G 3/3406 |
| 2019/0075281 A1 | 3/2019 | Hall et al. | |
| 2019/0318677 A1 | 10/2019 | Lu et al. | |
| 2020/0089002 A1 | 3/2020 | Lee | |
| 2020/0166764 A1 | 5/2020 | Lee et al. | |

OTHER PUBLICATIONS

International Search Report for Application No. PCT/US2021/012161, dated May 7, 2021, 12 pages.

Lee et al., "Abstract", Scientific Reports, XP055793397, DOI: 10.1038/s41598-020-72555-w, Retrieved from the Internet: URL:http://www.nature.com/articles/s41598-020-72555-w, vol. 10, No. 1, Sep. 30, 2020, 11 pages.

Lee et al., "Display technologies for augmented reality", Proceedings of SPIE, ISSN 0277-786X, vol. 10555, XP060101380, https://doi.org/10.1117/12.2289890, ISBN: 978-1-5106-1533-5, Feb. 8, 2018, pp. 1055511-1055511.

Akşit et al., "Near-Eye Varifocal Augmented Reality Display using See-Through Screens", ACM Transactions on Graphics, XP058473845, ISSN: 0730-0301, DOI:10.1145/3130800.3130892, vol. 36, No. 6, Article 1, Nov. 20, 2017, pp. 1:1-1:13.

Kim et al., "Foveated AR: Dynamically-Foveated Augmented Reality Display", ACM Transactions On Graphics, vol. 38, No. 4, Article 99, XP058452093, ISSN: 0730-0301, DOI:10.1145/3306346.3322987, Jul. 12, 2019, pp. 99:1-99:15.

Moon et al., "Augmented reality near-eye display using Pancharatnam-Berry phase lenses", Scientific Reports, XP055588677, DOI: 10.1038/541598-019-42979-0, vol. 9, No. 1, Apr. 29, 2019, pp. 1-10.

Tan et al., "Foveated imaging for near-eye displays", Optics Express, vol. 26, No. 19, XP055525627, DOI: 10.1364/OE.26.025076, Sep. 17, 2018, pp. 25076-25085.

\* cited by examiner

FOVEATED DISPLAY SYSTEM

CROSS-REFERENCE TO RELATED APPLICATIONS

This application is related to patent applications entitled "Pancake Lens Including Diffuser" (16/735,414) and "Switchable Pancharatnam-Berry Phase Grating Stack" (16/735,425), which are assigned to the same assignee of this application and filed on the same day as this application, and which are herein incorporated by reference in their entireties.

BACKGROUND

Field of the Various Embodiments

Embodiments of this disclosure relate generally to optical systems and, more specifically, to a foveated display system.

Description of the Related Art

Artificial reality systems display content that may include completely generated content or generated content combined with captured (e.g., real-world) content. A realistic display should account for what a user sees in his or her peripheral vision, as well as the high-acuity vision produced by the fovea centralis (also referred to herein as the "fovea") located in the back of the user's eyes. For some artificial reality systems, such as head-mounted display (HMD) systems, a small form factor and light design are also desirable. Designing such artificial reality systems has proven to be difficult.

SUMMARY

One embodiment of the present disclosure sets forth a foveated display system. The foveated display system includes a foveal display module comprising a lens that is angular and wavelength selective. The foveated display system further includes a peripheral display module comprising a diffuser disposed in-line with the lens.

Another embodiment of the present disclosure sets forth a head-mounted display (HMD). The HMD includes a foveal display system disposed in series with a peripheral display system. The foveal display system includes a lens that is angular and wavelength selective. The peripheral display system includes a diffuser.

Another embodiment of the present disclosure sets forth a method. The method includes detecting a pupil position of an eye of a user. The method further includes generating a virtual image using at least a lens that is angular and wavelength selective. The virtual image is focused towards a foveal region of the eye of the user corresponding to the detected pupil position. In addition, the method includes generating a projected image using at least a diffuser disposed in-line with the lens. The lens permits light associated with the projected image to pass through the lens.

One advantage of the foveated display systems disclosed herein is that the foveated display systems generate high-resolution virtual imagery for a foveal region of a user's eye gaze along with low-resolution, large field of view background imagery for other regions of the user's eye gaze. A diffuser that is used to generate the projected imagery can be disposed within a pancake lens, which is a relatively compact (i.e., thinner) design that is beneficial for applications with a HMD or other devices where a small form factor and weight are considerations. In addition, a switchable Pancharatnam-Berry phase grating stack can be used to increase the steering range of a beam-steering device used to generate the high-resolution virtual imagery such that, e.g., light associated with the virtual imagery can be steered to cover an entire field of view that is visible to the user's eye. These technical advantages represent one or more technological advancements over prior art approaches.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

Figure 1A:
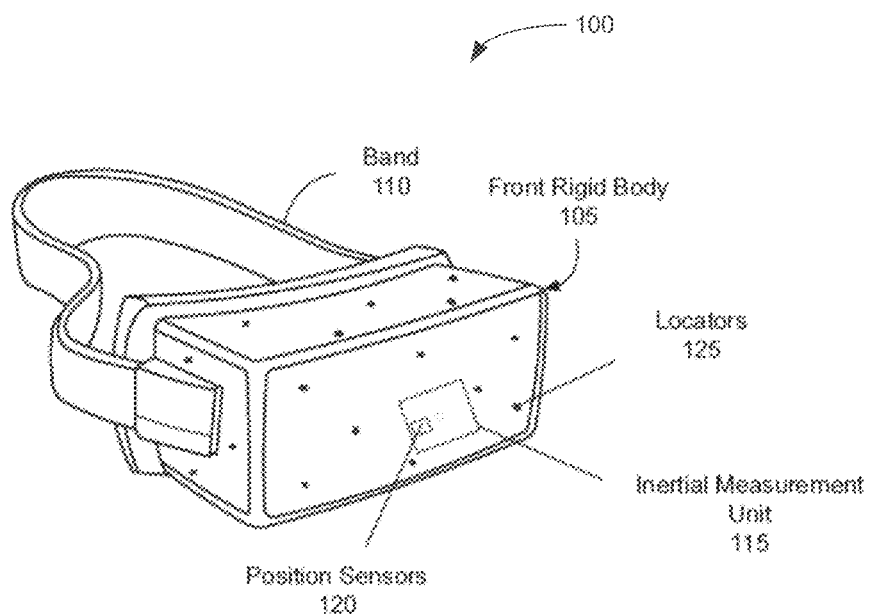
FIG. 1A is a diagram of a near eye display (NED), according to various embodiments.

In the following description, numerous specific details are set forth to provide a more thorough understanding of the various embodiments. However, it is apparent to one of skilled in the art that the disclosed concepts may be practiced without one or more of these specific details.

Configuration Overview

One or more embodiments disclosed herein relate to a foveated display system. The foveated display system includes a peripheral display module disposed in series with a foveal display module. The peripheral display module is configured to generate low-resolution, large field of view (FOV) imagery for a user's peripheral vision, while the foveal display module is configured to perform foveated rendering in which high-resolution imagery is focused towards a foveal region of the user's eye gaze. In addition, real-world light can pass through the peripheral and foveal display modules and be observed by the user.

The peripheral display module includes a projection device that projects background imagery for a user's peripheral vision onto a diffuser that diffuses the background imagery, as well as a pancake lens that increases the propagating distance of light such that the background imagery appears further away to the user. The diffuser is polarization, angular, and wavelength selective in some embodiments. Such a diffuser may be constructed using, e.g., a cholesteric liquid crystal material. In operation, circularly polarized light is projected onto the diffuser at a slanted angle and bounces twice within the pancake lens. In some embodiments, the diffuser may also be included within the pancake lens, which is a more compact (i.e., thinner) design than one in which the diffuser is external to the pancake lens.

The foveal display module includes a holographic display, a beam-steering device such as a micro-electro-mechanical system (MEMS) mirror, an angular- and wavelength-selective lens such as a holographic optical element (HOE) lens, and an eye tracking device. In operation, the beam-steering device is controllable to focus light from the holographic display towards a foveal region of a user's eye gaze via the angular- and wavelength-selective lens, based on a pupil position captured by the eye tracking device. In some embodiments, the foveal display module may also include a switchable Pancharatnam-Berry Phase (PBP) grating stack that increases a steering range of the beam-steering device. In such cases, the switchable PBP grating stack may include a switchable half-wave plate disposed between two PBP gratings. The diffraction angle produced by one PBP grating in the switchable PBP grating stack differs based on a handedness of polarization of light output by the switchable half-wave plate when the switchable half-wave plate is on versus when the switchable half-wave plate is off.

Embodiments of the disclosure may also include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) connected to a host computer system, a standalone HMD, a mobile device or computing system, or any other hardware platform capable of providing artificial reality content to one or more viewers.

Embodiments of the disclosure may also include or be implemented in conjunction with an artificial reality system. Artificial reality is a form of reality that has been adjusted in some manner before presentation to a user, which may include, for example, a VR system, an AR system, a MR system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a HMD connected to a host computer system, a standalone HMD, a mobile device or computing system, or any other hardware platform capable of providing artificial reality content to one or more viewers.

System Overview

FIG. 1A is a wire diagram of a near eye display (NED) 100, according to various embodiments. Although NEDs and head mounted displays (HMDs) are disclosed herein as reference examples, display devices that include foveated display systems may also be configured for placement in proximity of an eye or eyes of a user at a fixed location, without being head-mounted (e.g., the display device may be mounted in a vehicle, such as a car or an airplane, for placement in front of an eye or eyes of the user).

As shown, the NED 100 includes a front rigid body 105 and a band 110. The front rigid body 105 includes one or more electronic display elements of an electronic display (not shown), an inertial measurement unit (IMU) 115, one or more position sensors 120, and locators 125. As illustrated in FIG. 1A, position sensors 120 are located within the IMU 115, and neither the IMU 115 nor the position sensors 120 are visible to the user. In various embodiments, where the NED 100 acts as an AR or MR device, portions of the NED 100 and/or its internal components are at least partially transparent.

Figure 1B:
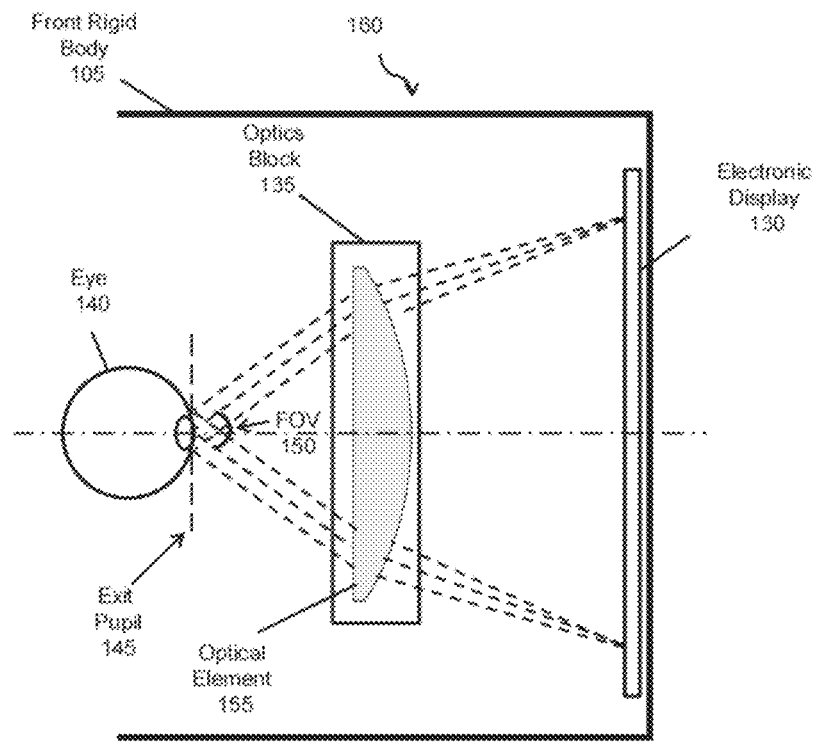
FIG. 1B is a cross section of the front rigid body of the embodiments of the NED illustrated in FIG. 1A.

FIG. 1B is a cross section 160 of the front rigid body 105 of the embodiments of the NED 100 illustrated in FIG. 1A. As shown, the front rigid body 105 includes an electronic display 130 and an optics block 135 that together provide image light to an exit pupil 145. The exit pupil 145 is the location of the front rigid body 105 where a user's eye 140 may be positioned. For purposes of illustration, FIG. 1B shows a cross section 160 associated with a single eye 140, but another optics block, separate from the optics block 135, may provide altered image light to another eye of the user. Additionally, the NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

The electronic display 130 displays images to the user. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode display (AMO-LED), a QOLED, a QLED, some other display, or some combination thereof.

The optics block 135 adjusts an orientation of image light emitted from the electronic display 130 such that the electronic display 130 appears at particular virtual image distances from the user. The optics block 135 is configured to receive image light emitted from the electronic display 130 and direct the image light to an eye-box associated with the exit pupil 145. The image light directed to the eye-box forms an image at a retina of eye 140. The eye-box is a region defining how much the eye 140 moves up/down/left/right from without significant degradation in the image quality. In the illustration of FIG. 1B, a field of view (FOV) 150 is the extent of the observable world that is seen by the eye 140 at any given moment.

Additionally, in some embodiments, the optics block 135 magnifies received light, corrects optical errors associated with the image light, and presents the corrected image light to the eye 140. The optics block 135 may include one or more optical elements 155 in optical series. An optical element 155 may be an aperture, a Fresnel lens, a convex lens, a concave lens, a filter, a waveguide, a Pancharatnam-Berry phase (PBP) lens or grating, a color-selective filter, a waveplate, a C-plate, or any other suitable optical element 155 that affects the image light. Moreover, the optics block 135 may include combinations of different optical elements. One or more of the optical elements in the optics block 135 may have one or more coatings, such as anti-reflective coatings. In some embodiments, the optics block 135 may include optical elements of one or more of the foveated, peripheral, and/or foveal systems discussed in detail below in conjunction with FIGS. 4-11.

Figure 2A:
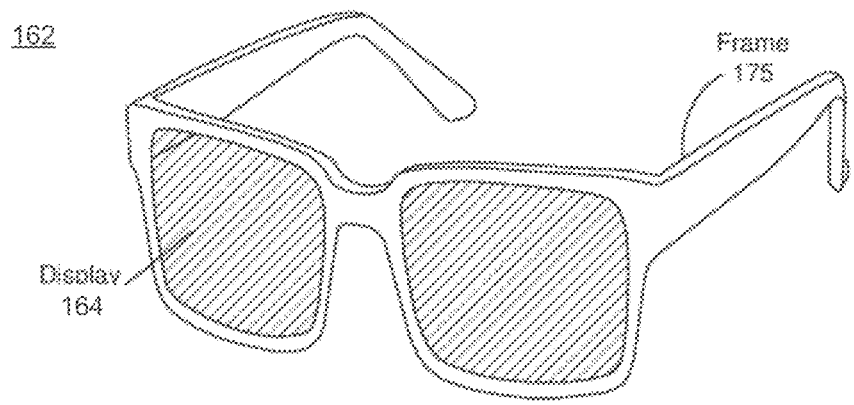
FIG. 2A is a diagram of a head-mounted display (HMD) implemented as a NED, according to various embodiments.

FIG. 2A is a diagram of an HMD 162 implemented as a NED, according to various embodiments. As shown, the HMD 162 is in the form of a pair of augmented reality glasses. The HMD 162 presents computer-generated media to a user and augments views of a physical, real-world environment with the computer-generated media. Examples of computer-generated media presented by the HMD 162 include one or more images, video, audio, or some combination thereof. In some embodiments, audio is presented via an external device (e.g., speakers and headphones) that receives audio information from the HMD 162, a console (not shown), or both, and presents audio data based on audio information. In some embodiments, the HMD 162 may be modified to also operate as a VR HMD, a MR HMD, or some combination thereof. The HMD 162 includes a frame 175 and a display 164. As shown, the frame 175 mounts the NED to the user's head, while the display 164 provides image light to the user. The display 164 may be customized to a variety of shapes and sizes to conform to different styles of eyeglass frames.

Figure 2B:
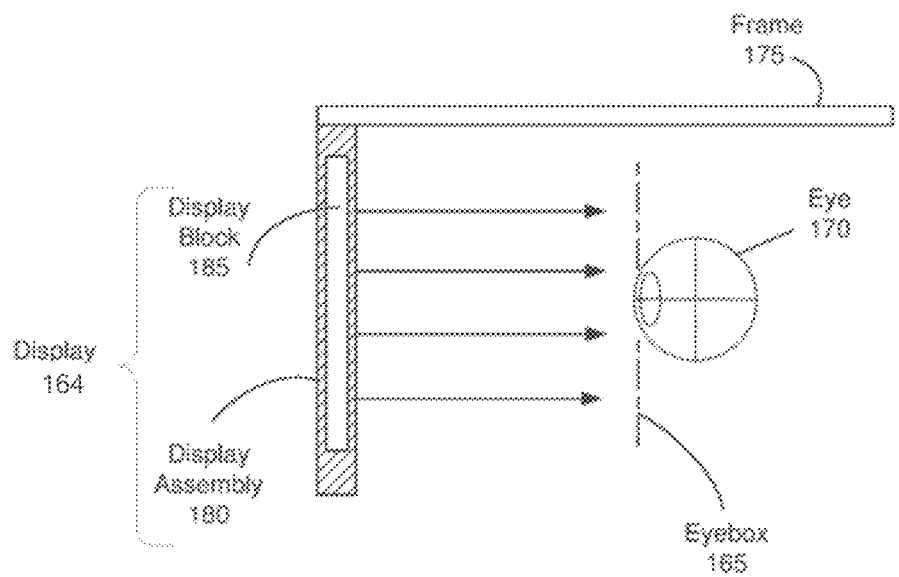
FIG. 2B is a cross-section view of the HMD of FIG. 2A implemented as a near eye display, according to various embodiments.

FIG. 2B is a cross-section view of the HMD 162 of FIG. 2A implemented as a NED, according to various embodiments. This view includes frame 175, display 164 (which comprises a display assembly 180 and a display block 185), and eye 170. The display assembly 180 supplies image light to the eye 170. The display assembly 180 houses display block 185, which, in different embodiments, encloses the different types of imaging optics and redirection structures. For purposes of illustration, FIG. 2B shows the cross section associated with a single display block 185 and a single eye 170, but in alternative embodiments not shown, another display block, which is separate from display block 185 shown in FIG. 2B, provides image light to another eye of the user.

The display block 185, as illustrated, is configured to combine light from a local area with light from computer generated image to form an augmented scene. The display block 185 is also configured to provide the augmented scene to the eyebox 165 corresponding to a location of the user's eye 170. The display block 185 may include, for example, a waveguide display, a focusing assembly, a compensation assembly, or some combination thereof. In some embodiments, the display block 185 may include one or more components of the foveated, peripheral, and/or foveal systems discussed in detail below in conjunction with FIGS. 4-11.

HMD 162 may include one or more other optical elements between the display block 185 and the eye 170. The optical elements may act to, for example, correct aberrations in image light emitted from the display block 185, magnify image light emitted from the display block 185, some other optical adjustment of image light emitted from the display block 185, or some combination thereof. The example for optical elements may include an aperture, a Fresnel lens, a convex lens, a concave lens, a filter, or any other suitable optical element that affects image light. The display block 185 may also comprise one or more materials (e.g., plastic, glass, etc.) with one or more refractive indices that effectively minimize the weight and widen a field of view of the HMD 162.

Figure 3:
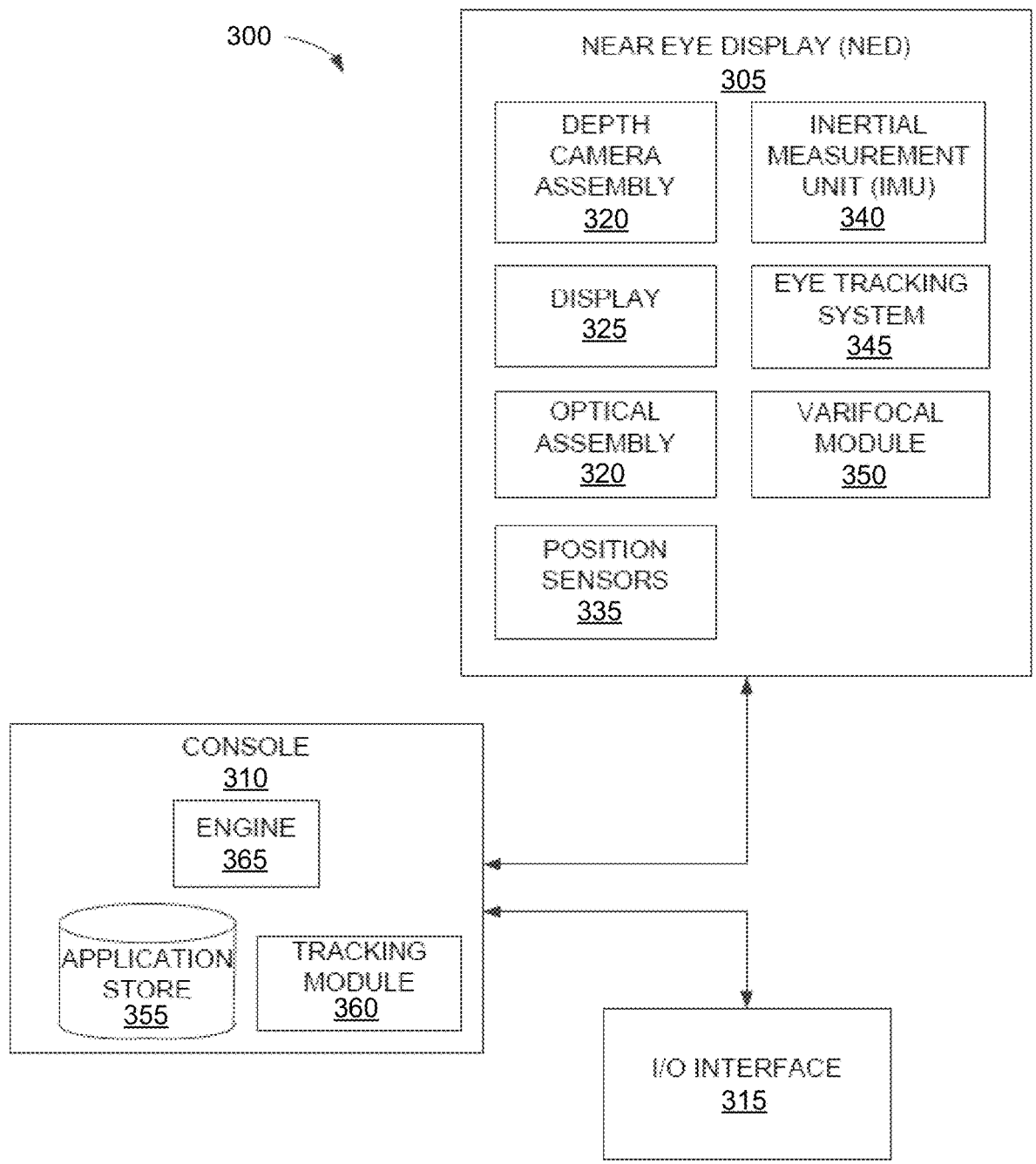
FIG. 3 is a block diagram of a NED system, according to various embodiments.

FIG. 3 is a block diagram of an embodiment of a near eye display system 300 in which a console 310 operates. In some embodiments, the NED system 300 corresponds to the NED 100 or the HMD 162. The NED system 300 may operate in a VR system environment, an AR system environment, a MR system environment, or some combination thereof. The NED system 300 shown in FIG. 3 comprises a NED 305 and an input/output (I/O) interface 315 that is coupled to the console 310.

While FIG. 3 shows an example NED system 300 including one NED 305 and one I/O interface 315, in other embodiments any number of these components may be included in the NED system 300. For example, there may be multiple NEDs 305 that each has an associated I/O interface 315, where each NED 305 and I/O interface 315 communicates with the console 310. In alternative configurations, different and/or additional components may be included in the NED system 300. Additionally, various components included within the NED 305, the console 310, and the I/O interface 315 may be distributed in a different manner than is described in conjunction with FIG. 3 in some embodiments. For example, some or all of the functionality of the console 310 may be provided by the NED 305.

The NED 305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 305 may also present audio content to a user. The NED 305 and/or the console 310 may transmit the audio content to an external device via the I/O interface 315. The external device may include various forms of speaker systems and/or headphones. In various embodiments, the audio content is synchronized with visual content being displayed by the NED 305.

The NED 305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 3, the NED 305 may include a depth camera assembly (DCA) 320, a display 325, an optical assembly 330, one or more position sensors 335, an inertial measurement unit (IMU) 340, an eye tracking system 345, and a varifocal module 350. In some embodiments, the display 325 and the optical assembly 330 can be integrated together into a projection assembly. Various embodiments of the NED 305 may have additional, fewer, or different components than those listed above. Additionally, the functionality of each component may be partially or completely encompassed by the functionality of one or more other components in various embodiments.

The DCA 320 captures sensor data describing depth information of an area surrounding the NED 305. The sensor data may be generated by one or a combination of depth imaging techniques, such as triangulation, structured light imaging, time-of-flight imaging, laser scan, and so forth. The DCA 320 can compute various depth properties of the area surrounding the NED 305 using the sensor data. Additionally or alternatively, the DCA 320 may transmit the sensor data to the console 310 for processing.

The DCA 320 includes an illumination source, an imaging device, and a controller. The illumination source emits light onto an area surrounding the NED 305. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 325 displays two-dimensional or three-dimensional images to the user in accordance with pixel data received from the console 310. In various embodiments, the display 325 comprises a single display or multiple displays (e.g., separate displays for each eye of a user). In some embodiments, the display 325 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 325 and used separately, in parallel, and/or in combination.

The optical assembly 330 magnifies image light received from the display 325, corrects optical errors associated with the image light, and presents the corrected image light to a user of the NED 305. The optical assembly 330 includes a plurality of optical elements. For example, one or more of the following optical elements may be included in the optical assembly 330: an aperture, a Fresnel lens, a convex lens, a concave lens, a filter, a reflecting surface, or any other suitable optical element that deflects, reflects, refracts, and/or in some way alters image light. Moreover, the optical assembly 330 may include combinations of different optical elements. In some embodiments, one or more of the optical elements in the optical assembly 330 may have one or more coatings, such as partially reflective or antireflective coatings. The optical assembly 330 can be integrated into a projection assembly, e.g., a projection assembly. In one embodiment, the optical assembly 330 includes the optics block 155.

In operation, the optical assembly 330 magnifies and focuses image light generated by the display 325. In so doing, the optical assembly 330 enables the display 325 to be physically smaller, weigh less, and consume less power than displays that do not use the optical assembly 330. Additionally, magnification may increase the field of view of the content presented by the display 325. For example, in some embodiments, the field of view of the displayed content partially or completely uses a user's field of view. For example, the field of view of a displayed image may meet or exceed 310 degrees. In various embodiments, the amount of magnification may be adjusted by adding or removing optical elements.

In some embodiments, the optical assembly 330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 325 is pre-distorted, and the optical assembly 330 corrects the distortion as image light from the display 325 passes through various optical elements of the optical assembly 330. In some embodiments, optical elements of the optical assembly 330 are integrated into the display 325 as a projection assembly that includes at least one waveguide coupled with one or more optical elements. In some embodiments the display 325 and/or the optical assembly 330 may include the peripheral display systems or components thereof discussed below in conjunction with FIGS. 4-7.

The IMU 340 is an electronic device that generates data indicating a position of the NED 305 based on measurement signals received from one or more of the position sensors 335 and from depth information received from the DCA 320. In some embodiments of the NED 305, the IMU 340 may be a dedicated hardware component. In other embodiments, the IMU 340 may be a software component implemented in one or more processors.

In operation, a position sensor 335 generates one or more measurement signals in response to a motion of the NED 305. Examples of position sensors 335 include: one or more accelerometers, one or more gyroscopes, one or more magnetometers, one or more altimeters, one or more inclinometers, and/or various types of sensors for motion detection, drift detection, and/or error detection. The position sensors 335 may be located external to the IMU 340, internal to the IMU 340, or some combination thereof.

Based on the one or more measurement signals from one or more position sensors 335, the IMU 340 generates data indicating an estimated current position of the NED 305 relative to an initial position of the NED 305. For example, the position sensors 335 may include multiple accelerometers to measure translational motion (forward/back, up/down, left/right) and multiple gyroscopes to measure rotational motion (e.g., pitch, yaw, and roll). In some embodiments, the IMU 340 rapidly samples the measurement signals and calculates the estimated current position of the NED 305 from the sampled data. For example, the IMU 340 may integrate the measurement signals received from the accelerometers over time to estimate a velocity vector and integrates the velocity vector over time to determine an estimated current position of a reference point on the NED 305. Alternatively, the IMU 340 provides the sampled measurement signals to the console 310, which analyzes the sample data to determine one or more measurement errors. The console 310 may further transmit one or more of control signals and/or measurement errors to the IMU 340 to configure the IMU 340 to correct and/or reduce one or more measurement errors (e.g., drift errors). The reference point is a point that may be used to describe the position of the NED 305. The reference point may generally be defined as a point in space or a position related to a position and/or orientation of the NED 305.

In various embodiments, the IMU 340 receives one or more parameters from the console 310. The one or more parameters are used to maintain tracking of the NED 305. Based on a received parameter, the IMU 340 may adjust one or more IMU parameters (e.g., a sample rate). In some embodiments, certain parameters cause the IMU 340 to update an initial position of the reference point so that it corresponds to a next position of the reference point. Updating the initial position of the reference point as the next calibrated position of the reference point helps reduce drift errors in detecting a current position estimate of the IMU 340.

In some embodiments, the eye tracking system 345 is integrated into the NED 305. The eye-tracking system 345 may comprise one or more illumination sources and an imaging device (camera). In operation, the eye tracking system 345 generates and analyzes tracking data related to a user's eyes as the user wears the NED 305. The eye tracking system 345 may further generate eye tracking information that may comprise information about a position of the user's eye, i.e., information about an angle of an eye-gaze.

In some embodiments, the varifocal module 350 is further integrated into the NED 305. The varifocal module 350 may be communicatively coupled to the eye tracking system 345 in order to enable the varifocal module 350 to receive eye tracking information from the eye tracking system 345. The varifocal module 350 may further modify the focus of image light emitted from the display 325 based on the eye tracking information received from the eye tracking system 345. Accordingly, the varifocal module 350 can reduce vergence-accommodation conflict that may be produced as the user's eyes resolve the image light. In various embodiments, the varifocal module 350 can be interfaced (e.g., either mechanically or electrically) with at least one optical element of the optical assembly 330.

In operation, the varifocal module 350 may adjust the position and/or orientation of one or more optical elements in the optical assembly 330 in order to adjust the focus of image light propagating through the optical assembly 330. In various embodiments, the varifocal module 350 may use eye tracking information obtained from the eye tracking system 345 to determine how to adjust one or more optical elements in the optical assembly 330. In some embodiments, the varifocal module 350 may perform foveated rendering of the image light based on the eye tracking information obtained from the eye tracking system 345 in order to adjust the resolution of the image light emitted by the display 325. In this case, the varifocal module 350 configures the display 325 to display a high pixel density in a foveal region of the user's eye-gaze and a low pixel density in other regions of the user's eye-gaze. In some embodiments, the varifocal module 350 may include the foveal display systems or components thereof that are discussed below in conjunction with FIGS. 4-5 and 8-11.

The I/O interface 315 facilitates the transfer of action requests from a user to the console 310. In addition, the I/O interface 315 facilitates the transfer of device feedback from the console 310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 315 may include one or more input devices. Example input devices include: a keyboard, a mouse, a game controller, a joystick, and/or any other suitable device for receiving action requests and communicating the action requests to the console 310. In some embodiments, the I/O interface 315 includes an IMU 340 that captures calibration data indicating an estimated current position of the I/O interface 315 relative to an initial position of the I/O interface 315.

In operation, the I/O interface 315 receives action requests from the user and transmits those action requests to the console 310. Responsive to receiving the action request, the console 310 performs a corresponding action. For example, responsive to receiving an action request, the console 310 may configure the I/O interface 315 to emit haptic feedback onto an arm of the user. For example, the console 315 may configure the I/O interface 315 to deliver haptic feedback to a user when an action request is received. Additionally or alternatively, the console 310 may configure the I/O interface 315 to generate haptic feedback when the console 310 performs an action, responsive to receiving an action request.

The console 310 provides content to the NED 305 for processing in accordance with information received from one or more of: the DCA 320, the NED 305, and the I/O interface 315. As shown in FIG. 3, the console 310 includes an application store 355, a tracking module 360, and an engine 365. In some embodiments, the console 310 may have additional, fewer, or different modules and/or components than those described in conjunction with FIG. 3. Similarly, the functions further described below may be distributed among components of the console 310 in a different manner than described in conjunction with FIG. 3.

The application store 355 stores one or more applications for execution by the console 310. An application is a group of instructions that, when executed by a processor, performs a particular set of functions, such as generating content for presentation to the user. For example, an application may generate content in response to receiving inputs from a user (e.g., via movement of the NED 305 as the user moves his/her head, via the I/O interface 315, etc.). Examples of applications include: gaming applications, conferencing applications, video playback applications, or other suitable applications.

The tracking module 360 calibrates the NED system 300 using one or more calibration parameters. The tracking module 360 may further adjust one or more calibration parameters to reduce error in determining a position and/or orientation of the NED 305 or the I/O interface 315. For example, the tracking module 360 may transmit a calibration parameter to the DCA 320 in order to adjust the focus of the DCA 320. Accordingly, the DCA 320 may more accurately determine positions of structured light elements reflecting off of objects in the environment. The tracking module 360 may also analyze sensor data generated by the IMU 340 in determining various calibration parameters to modify. Further, in some embodiments, if the NED 305 loses tracking of the user's eye, then the tracking module 360 may re-calibrate some or all of the components in the NED system 300. For example, if the DCA 320 loses line of sight of at least a threshold number of structured light elements projected onto the user's eye, the tracking module 360 may transmit calibration parameters to the varifocal module 350 in order to re-establish eye tracking.

The tracking module 360 tracks the movements of the NED 305 and/or of the I/O interface 315 using information from the DCA 320, the one or more position sensors 335, the IMU 340 or some combination thereof. For example, the tracking module 360 may determine a reference position of the NED 305 from a mapping of an area local to the NED 305. The tracking module 360 may generate this mapping based on information received from the NED 305 itself. The tracking module 360 may also utilize sensor data from the IMU 340 and/or depth data from the DCA 320 to determine references positions for the NED 305 and/or I/O interface 315. In various embodiments, the tracking module 360 generates an estimation and/or prediction for a subsequent position of the NED 305 and/or the I/O interface 315. The tracking module 360 may transmit the predicted subsequent position to the engine 365.

The engine 365 generates a three-dimensional mapping of the area surrounding the NED 305 (i.e., the "local area") based on information received from the NED 305. In some embodiments, the engine 365 determines depth information for the three-dimensional mapping of the local area based on depth data received from the DCA 320 (e.g., depth information of objects in the local area). In some embodiments, the engine 365 calculates a depth and/or position of the NED 305 by using depth data generated by the DCA 320. In particular, the engine 365 may implement various techniques for calculating the depth and/or position of the NED 305, such as stereo based techniques, structured light illumination techniques, time-of-flight techniques, and so forth. In various embodiments, the engine 365 uses depth data received from the DCA 320 to update a model of the local area and to generate and/or modify media content based in part on the updated model.

The engine 365 also executes applications within the NED system 300 and receives position information, acceleration information, velocity information, predicted future positions, or some combination thereof, of the NED 305 from the tracking module 360. Based on the received information, the engine 365 determines various forms of media content to transmit to the NED 305 for presentation to the user. For example, if the received information indicates that the user has looked to the left, the engine 365 generates media content for the NED 305 that mirrors the user's movement in a virtual environment or in an environment augmenting the local area with additional media content. Accordingly, the engine 365 may generate and/or modify media content (e.g., visual and/or audio content) for presentation to the user. The engine 365 may further transmit the media content to the NED 305. Additionally, in response to receiving an action request from the I/O interface 315, the engine 365 may perform an action within an application executing on the console 310. The engine 305 may further provide feedback when the action is performed. For example, the engine 365 may configure the NED 305 to generate visual and/or audio feedback and/or the I/O interface 315 to generate haptic feedback to the user.

In some embodiments, based on the eye tracking information (e.g., orientation of the user's eye) received from the eye tracking system 345, the engine 365 determines a resolution of the media content provided to the NED 305 for presentation to the user on the display 325. The engine 365 may adjust a resolution of the visual content provided to the NED 305 by configuring the display 325 to perform foveated rendering of the visual content, based at least in part on a direction of the user's gaze received from the eye tracking system 345. The engine 365 provides the content to the NED 305 having a high resolution on the display 325 in a foveal region of the user's gaze and a low resolution in other regions, thereby reducing the power consumption of the NED 305. In addition, using foveated rendering reduces a number of computing cycles used in rendering visual content without compromising the quality of the user's visual experience. In some embodiments, the engine 365 can further use the eye tracking information to adjust a focus of the image light emitted from the display 325 in order to reduce vergence-accommodation conflicts. In some embodiments, the engine 365 may interoperate with one or more of the foveated, peripheral, and/or foveal systems, or components thereof, that are discussed in detail below in conjunction with FIGS. 4-11.

Foveated Display System

Figure 4:
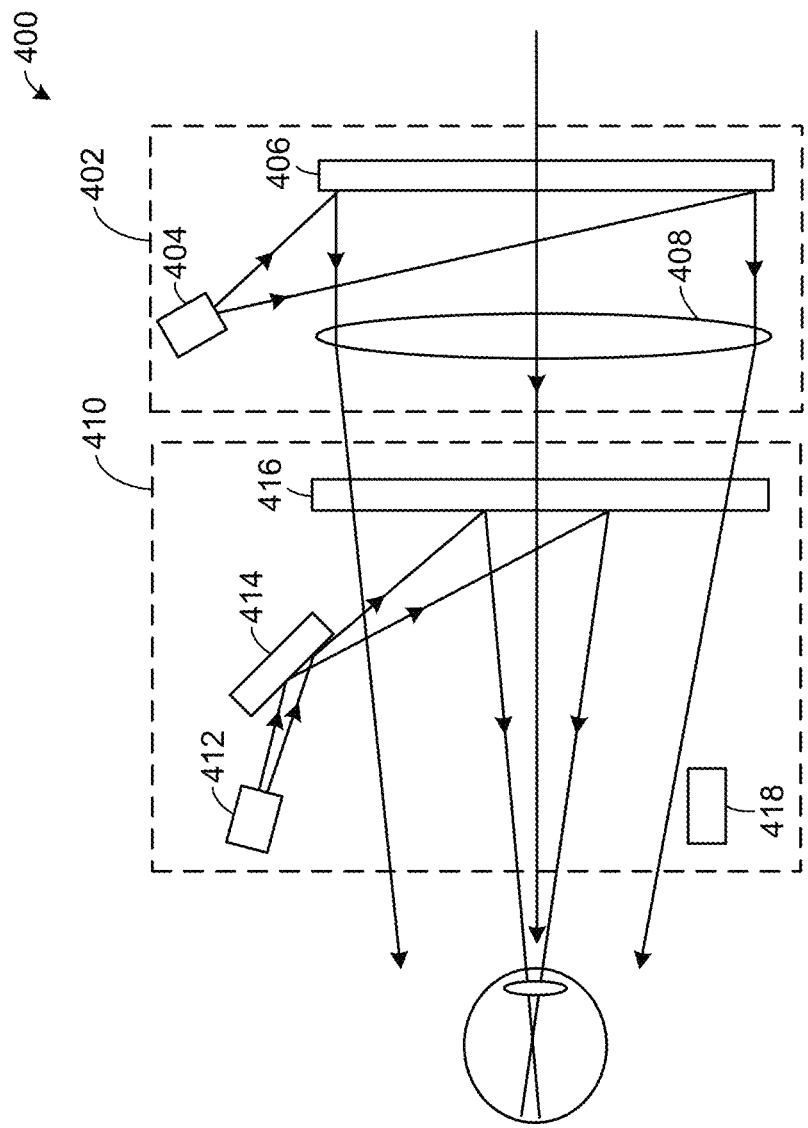
FIG. 4 is a schematic diagram illustrating a foveated display system, according to various embodiments.

FIG. 4 is a schematic diagram illustrating a foveated display system 400, according to various embodiments. As shown, the foveated display system 400 includes a peripheral display module 402 and a foveal display module 410. For purposes of illustration, FIGS. 4-11 show a single foveated display system and components thereof that provide image light to one eye of a user. In some embodiments not shown, another separate foveated display system may provide image light to another eye of the user.

In operation, the foveated display system 400 is configured to generate high-resolution virtual imagery via foveated rendering for a foveal region of a user's eye gaze, as well as low-resolution, large field of view (FOV) background imagery for other regions of the user's eye gaze. In particular, the foveal display module 410 is configured to generate the high-resolution virtual imagery, while the peripheral display module 402 is configured to generate the low-resolution, large FOV background imagery. In addition, the peripheral and foveal display modules 402 and 410 are configured to permit real-world light to pass through and be observed by the user.

As shown, the peripheral display module 402 includes a projection device 404, a diffuser 406, and a pancake lens 408. The foveal display module 410 includes a holographic display 412, a beam-steering device 414, an angular- and wavelength-selective lens 416, and an eye-tracking module 418. Illustratively, the diffuser 406 and the angular- and wavelength-selective lens 416 are in-line with one another. That is, the diffuser 406 and the angular- and wavelength-selective lens 416 share a common axis.

In operation, the projection device 404 emits polarized light corresponding to generated imagery. As shown, the polarized light is projected at a slanted angle onto the diffuser 406, which reflects and diffuses such light due to polarization and angular selectivity characteristics of the diffuser 406. In some embodiments, the diffuser 406 may be polarization, angular, and wavelength selective. In such cases, the diffuser 406 may permit most light to pass through, but diffuse light having a particular handedness of polarization that is within a particular range of wavelengths and incident on the diffuser 406 within a particular range of angles. More generally, any technically-feasible diffuser may be used that is able to diffuse light from the projection device 404 that is projected thereon while permitting other light (e.g., real-world light) to pass through.

Light diffused by the diffuser 406 provides low-resolution, high FOV background imagery for the non-foveal regions of a user's eye gaze. In addition, real-world light, i.e., light from a real-world scene, that is incident on the diffuser 406 passes through the diffuser 406 without being diffused due to the polarization, angular, and wavelength selectivity characteristics of the diffuser 406. As a result, the user can observe both the low-resolution, high FOV background imagery generated using the diffuser 406 and real-world content.

As shown, light diffused by the diffuser 406 is passed through the pancake lens 408. A pancake lens is a folded optic in which light that enters reflects, or "bounces," through multiple times before exiting. The multiple bounces increase the propagation distance of light, which can in turn increase the perceived distance of imagery from a user and/or magnify the imagery. By increase the propagating distance of light, the pancake lens 408 causes the low-resolution, high FOV background imagery generated via the diffuser 406 to appear further away from a user. Illustratively, the pancake lens 408 also has focal power, which can make the low-resolution, high FOV background imagery appear even further away. Although a pancake lens is described herein as a reference example, in other embodiments, any technically-feasible optical element(s) may be used to increase the propagating distance of light or otherwise increase the perceived distance of imagery from a user and/or magnify the imagery.

Although shown as distinct components for illustrative purposes, in some embodiments the diffuser 406 may be included within the pancake lens 408. Such embodiments are discussed in greater detail below in conjunction with FIGS. 6-7. That is, the diffuser 406 may generally be included within, or be external to, the pancake lens 408. Configurations in which the diffuser 406 is included within the pancake lens 408 are more compact than configurations in which the diffuser 406 is distinct from the pancake lens 408. Such compactness can be beneficial for applications with a HMD or other devices where a small form factor and weight are considerations.

As shown, light that has passed through the pancake lens 408 further passes through the angular- and wavelength-selective lens 416 of the foveal display module 410 toward an eye box. In some embodiments, the angular- and wavelength-selective lens 416 also has focal power. In operation, such an angular- and wavelength-selective lens 416 may allow through most light, including the light that has passed through the pancake lens 408, while reflecting and focusing light that is within a particular range of wavelengths and incident on the lens 416 within a particular range of angles, including light from the holographic display 412 that is steered onto the angular- and wavelength-selective lens 416 by the beam-steering device 414.

As shown, the beam-steering device 414 is a beam-steering mirror. The beam-steering mirror 414 is configured to perform gaze-following steering in which the beam-steering mirror 414 steers light from the holographic display 412 toward a foveal region of a user's eye gaze via the angular- and wavelength-selective lens 416, thereby producing high-resolution virtual imagery that can be observed by the user. In some embodiments, the beam-steering mirror 414 may be a microelectro-mechanical system (MEMS) mirror. Although such a MEMS mirror is described herein as a reference example, in other embodiments, any technically-feasible device may be used to steer light toward a foveal region of a user's eye gaze.

As shown, the angular- and wavelength-selective lens 416 reflects light from the holographic display 412 that is focused onto the lens 416 at various angles by the beam-steering mirror 414, due to the wavelength and angular selectivity characteristics of the lens 416. In some embodiments, the angular- and wavelength-selective lens 416 may be a holographic optical element (HOE), such as a volume grating lens. A HOE is an optical element produced using holographic imaging processes or principles. Although discussed herein primarily with respect to a HOE for illustrative purposes, any optical element(s) that perform functionalities of the angular- and wavelength-selective lens 416 described herein may be used in other embodiments.

The holographic display 412 is a display that uses light diffraction to create a virtual image. In some embodiments, the holographic display 412 may include a spatial light modulator that is configured to modulate light emitted by a projection device. Further, light produced by the holographic display 412 may be within a wavelength range that is reflected by the angular- and wavelength-selective lens 416 when incident thereon within a particular range of angles. Although discussed herein primarily with respect to a holographic display for illustrative purposes, in other embodiments, any technically-feasible display device(s) capable of generating light that can be focused on a foveal region of a user's eye gaze to produce high-resolution imagery may be used.

As the foregoing illustrates, a user of the foveated display system 400 can observe AR content that includes (1) high-resolution virtual imagery focused on a foveal region of the user's eye gaze by the foveal display module 410, (2) low resolution, high FOV background imagery produced by the peripheral display module 402, and (3) content from a real-world scene. Although AR is described herein as a reference example, it should be understood that the foveated display system 400 may also be used in other artificial reality applications, such as VR, MR, hybrid reality, or some combination and/or derivative thereof. For example, in the case of VR, real-world light would not be included in the output of the foveated display system 400.

Figure 5:
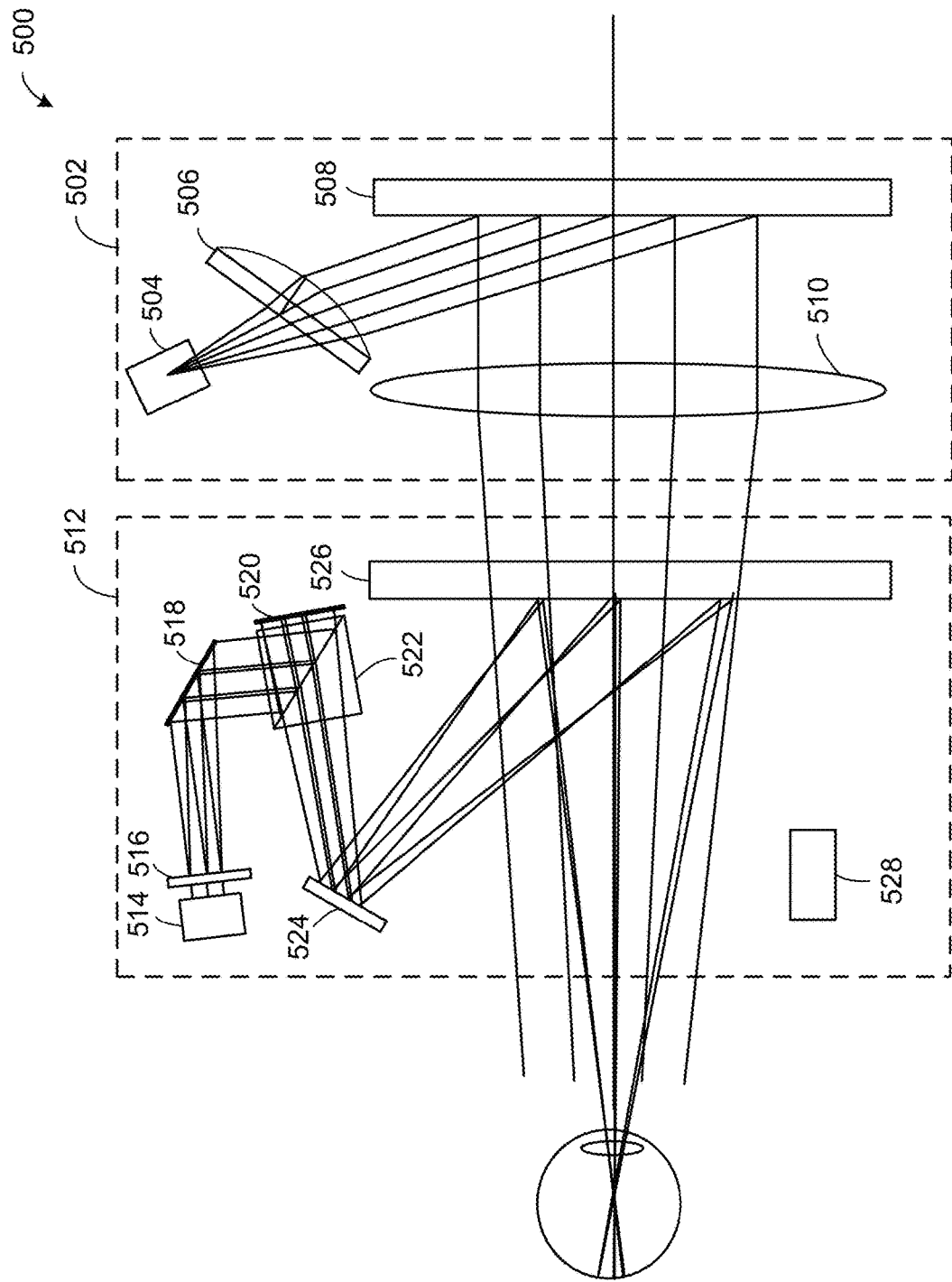
FIG. 5 illustrates in greater detail components of a foveated display system, according to various embodiments.

FIG. 5 illustrates in greater detail components of a foveated display system 500, according to various embodiments. As shown, the foveated display system 500 includes a peripheral display module 502 and a foveal display module 512, which correspond to the peripheral display module 402 and the foveal display module 410, respectively, that are described above in conjunction with FIG. 4. In operation, the foveal display module 512 is configured to generate high-resolution virtual imagery via foveated rendering for a foveal region of a user's eye gaze, while the peripheral display module 502 is configured to generate low-resolution, large FOV background imagery for other regions of the user's eye gaze.

As shown, the peripheral display module 502 includes a projection device 502, which may comprise any technically-feasible light source, such as a light-emitting diode (LED) device, an organic LED (OLED), a laser, etc. In some embodiments, the projection device 502 may be a pico projector.

The peripheral display module 502 further includes a condenser 506 that is configured to render a divergent light beam from the projection device 502 into a parallel beam that is projected onto a diffuser 508. The diffuser 508 is a polarization, angular, and wavelength selective diffuser, similar to the diffuser 406 described above in conjunction with FIG. 4. A diffuser having characteristics of the diffuser 508 described herein, including polarization, angular, and wavelength selectivity, may be constructed using cholesteric liquid crystal materials. In some embodiments, the diffuser 508 may be a volume grating lens constructed using a cholesteric liquid crystal material. More generally, any technically feasible material(s) may be used to construct the diffuser 508.

Similar to the discussion above in conjunction with FIG. 4, the projection device 502 emits polarized light associated with generated imagery that is projected, via the condenser 506, onto the diffuser 508 at a slanted angle. Due to the polarization and angular selectivity characteristics of the diffuser 508, the diffuser 508 is configured to reflect and diffuse the projected light toward an eye box. Such diffusion produces low-resolution, high FOV background imagery for non-foveal regions of a user's eye gaze.

As described, the polarization and angular selectivity characteristics of the diffuser 508 cause the diffuser 508 to only diffuse or scatter light having a particular handedness of polarization that is incident on the diffuser 508 within a particular range of angles. For example, in a particular embodiment, the diffuser 508 could selectively diffuse light that has one handedness of polarization and is incident on the diffuser 508 at an angle into 40°, while permitting other light to pass through without being diffused. In some embodiments, the diffuser 508 is configured to diffuse right-circularly polarized (RCP) light that is incident thereon within a particular range of angles. In such cases, the diffuser 508 may permit light that is left-circularly polarized (LCP) and/or incident on the diffuser 508 at other angles (e.g., 0 degrees) to pass through without being diffused, though some attenuation of the light may occur. Although light having particular handedness of polarization and incident on optical elements at particular angle(s) are described herein for illustrative purposes, in other embodiments light that has any handedness of polarization and/or is incident on optical elements within any technically feasible range(s) of angles, may be used. For example, in some embodiments the diffuser 508 may instead be configured to diffuse LCP light incident on the diffuser 508 within a particular range of angles and permit light that is RCP and/or incident on the diffuser 508 at other angles to pass through without being diffused.

As shown, the diffuser 508 is transparent to light from a real-world scene behind the diffuser 508. As a result, a user (wearing, e.g., a HMD that includes the foveated display system 400) can observe objects in the real-world scene in addition to generated content that is diffused by the diffuser 508 (and generated content that is focused on a foveal region of the user's eye gaze by the foveal display module 512, as discussed in greater detail below). Although optical elements are sometimes described herein as being transparent, it should be understood that some attenuation of light may occur as the light passes through "transparent" optical elements.

As shown, the diffused imagery that is produced by the diffuser 508 is further passed through a pancake lens 510, which corresponds to the pancake lens 408 and is configured to increase a propagating distance of light, thereby causing the diffused imagery to appear further away to a user. In some embodiments, the diffuser 508 may be included within the pancake lens 510, rather than being external to the pancake lens 510 as shown in FIG. 5. Such embodiments can be relatively compact and are discussed in greater detail below in conjunction with FIGS. 6-7.

Turning now to the foveal display module 512, as shown, the foveal display module includes a projection device 514 and a spatial light modulator (SLM) 516. In some embodiments, the SLM 516 is configured to modulate light incident thereon to provide a holographic display. In such cases, an application (e.g., one of the applications stored in the application store 355) or engine (e.g., the engine 365) may determine modulation(s) to light emitted by the projection device 514 required to generate virtual imagery and control the SLM 516 accordingly. In addition, light modulated by the SLM 516 may be focused onto the MEMS mirror 524 via a concave mirror 520 and one or more beam splitters (e.g., beam splitter 522).

In operation, an eye tracking module 528 is configured to track the pupil position of a user's eye. For example, in some embodiments, an application (e.g., one of the applications stored in the application store 355) or engine (e.g., the engine 365) may analyze tracking data related to the user's eye that is generated using one or more illumination sources and an imaging device (camera) included in a NED or HMD that is worn by the user, as described above in conjunction with FIG. 3.

The MEMS mirror 524 is controllable to steer light that has been reflected by the concave mirror 520 onto the MEMS mirror 524, based on a pupil position detected by the eye tracking module 528. That is, the MEMS mirror 524 may be controlled to perform gaze-following steering. In particular, the MEMS mirror 524 may be steered such that high-resolution imagery is reflected and focused by a HOE 526 so as to pass through a foveal region of the user's eye gaze corresponding to the detected pupil position. For example, the MEMS mirror 524 could be steered such that most light rays reflected by the MEMS mirror 524 pass through the user's pupil to provide appropriate gaze-direction views. In some embodiments, the MEMS mirror 524 may be steerable in three-directions to provide different fields of view that follow the user gaze direction.

In some embodiments, the foveal display module 512 may further include a switchable PBP grating stack that increases a steering range of the MEMS mirror 524, as discussed in greater detail below in conjunction with FIGS.

7-8. As used herein, the "steering range" of the MEMS mirror 524 refers to a range of angles through which the MEMS mirror 524 can steer light that is incident thereon. It should be understood that the steering range of the MEMS mirror 524 is limited by the tilt angle of the MEMS mirror 524, i.e., the angle at which the MEMS mirror 524 can be mechanically deflected. In some cases, a limited steering range of the MEMS mirror 524 may need to be extended to cover the entire field of view that is visible to an eye of a user. A switchable PBP grating stack may be used to increase the steering range of the MEMS mirror 524 in some embodiments. It should be understood, however, that the switchable PBP grating stack may be unnecessary if the MEMS mirror 524 has sufficient steering range for the relevant application.

As described, the HOE 526 is a lens having focal power and is further polarization, angular, and wavelength selective in some embodiments. In such cases, the HOE 526 may pass through most light, including light for the low-resolution, high FOV background imagery generated by the peripheral display module 502, as well as real-world light. At the same time, the HOE 526 is configured to reflect and focus light from the MEMS mirror 524 having particular wavelengths and incident on the HOE 526 within a particular range of angles toward a foveal region of a user's eye gaze. As a result, the user can observe high-resolution virtual imagery that is generated by the foveal display module 512 and focused onto the foveal region of the user's eye gaze, as well as low-resolution, large FOV background imagery generated by the peripheral display module 502 and real-world light that has passed through optical elements of the peripheral display module 502 and the foveal display module 512.

Although specific optical elements and devices are discussed herein as reference examples, in alternative embodiments any other technically-feasible types of optical elements and/or devices that are capable of performing the functionalities of the optical elements and/or devices disclosed herein may be used. In some embodiments, the foveated display systems 400 and 500 may also include other optical elements that are not shown. For example, the foveated display system 400 or 500 may include a combiner that is configured to combine real-world light with light that has been diffused and reflected by the diffuser 406 or the diffuser 510, respectively.

In some embodiments, each of the foveated display systems 400 and 500 may be included in a NED or HMD, such as the NEDs 100 or 300, or the HMD 162, described above in conjunction with FIGS. 1-3. In other embodiments, each of the foveated display systems 400 and 500 may include or be implemented in conjunction with an artificial reality system on any technically feasible platform, such as a mobile device, a computing system, or any other hardware platform capable of providing artificial reality content to one or more users.

Pancake Lens Including Diffuser

Figure 6:
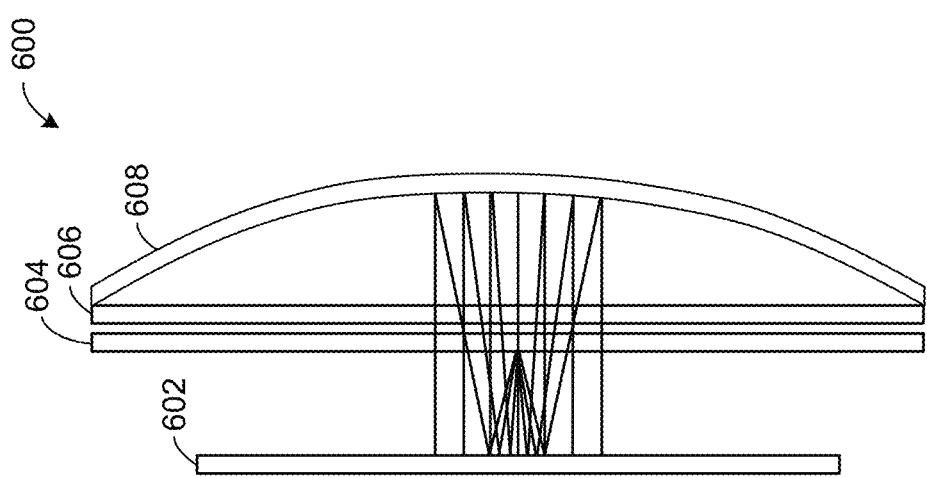
FIG. 6 is a schematic diagram illustrating a pancake lens that includes a diffuser, according to various embodiments.

FIG. 6 is a schematic diagram illustrating a pancake lens 600 that includes a diffuser, according to various embodiments. As described, a pancake lens is a folded optic in which light that enters reflects, or "bounces," through multiple times before exiting. Illustratively, light bounces twice through the pancake lens 600. The multiple bounces increase the propagation distance of light, which can in turn increase the perceived distance of imagery from a viewer and/or magnify the imagery.

As shown, the pancake lens 600 includes a polarization- and angular-selective mirror 602, a half-wave plate 604, a diffuser 606, and a half mirror 608. All or some of the components of the pancake lens 600 may be in physical contact with one another, share a substrate with one another, laminated with one another, optically in contact with one another, have index matching fluid or optical glue between one another, and/or may have space therebetween. For example, all or some of the some of the components of the pancake lens 600 could be the surfaces of lenses.

The polarization- and angular-selective mirror 602 is configured to selectively reflect one or more handedness of polarization of light that is incident on the mirror 602 within one or more ranges of angles, while allowing through other light. In some embodiments, the polarization- and angular-selective mirror 602 may selectively allow through LCP light that is incident on the mirror 602 within a particular range of angles and RCP light that is incident on the mirror 602 at 0°, while reflecting LCP light that is incident on the mirror 602 at 0°, as discussed in greater detail below in conjunction with FIG. 7. Further, the polarization- and angular-selective mirror 602 maintains the polarization of reflected light, like a Bragg reflector. In some embodiments, the polarization- and angular-selective mirror 602 may be a volume grating mirror constructed from a liquid crystal material having polarization selectivity. More generally, the polarization- and angular-selective mirror 602 may be constructed from any technically-feasible material(s).

In contrast to the polarization- and angular-selective mirror 602, the half mirror 608 is a simple meta-mirror that does not maintain the handedness of reflected light. In particular, the half mirror 608 is configured to allow through one handedness of polarization of light while reflecting the other handedness of polarization. In addition, the handedness of polarization of light reflected by the half mirror 608 is converted to the opposite handedness. For example, in some embodiments, the half mirror 608 may allow through LCP light while reflecting RCP light as LCP light, as discussed in greater detail below in conjunction with FIG. 7.

The half-wave plate 604 is configured to retard one linear component of light relative to the other component by 180°. As a result, the half-wave plate 604 converts the handedness of polarization of light incident thereon into the other handedness of polarization. For example, the half-wave plate 604 could convert LCP light into RCP light, and vice versa.

The diffuser 606 is similar to the diffusers 406 and 508 described above in conjunction with FIGS. 4 and 5, respectively, in some embodiments. In such cases, the diffuser 606 may be polarization, angular, and wavelength selective. For example, the diffuser 606 could be configured to diffuse RCP light from a projector that is incident thereon within a particular range of angles while allowing through other light, as discussed in greater detail below in conjunction with FIG. 7.

As shown, the diffuser 606 is disposed between the half-wave plate 604 and the half mirror 608 within the pancake lens 600. An optical system in which the diffuser 606 is included within the pancake lens 600 is more compact than systems having a diffuser that is external to a pancake lens, which can be beneficial for applications with a HMD or other devices where a small form factor and weight are considerations.

Figure 7:
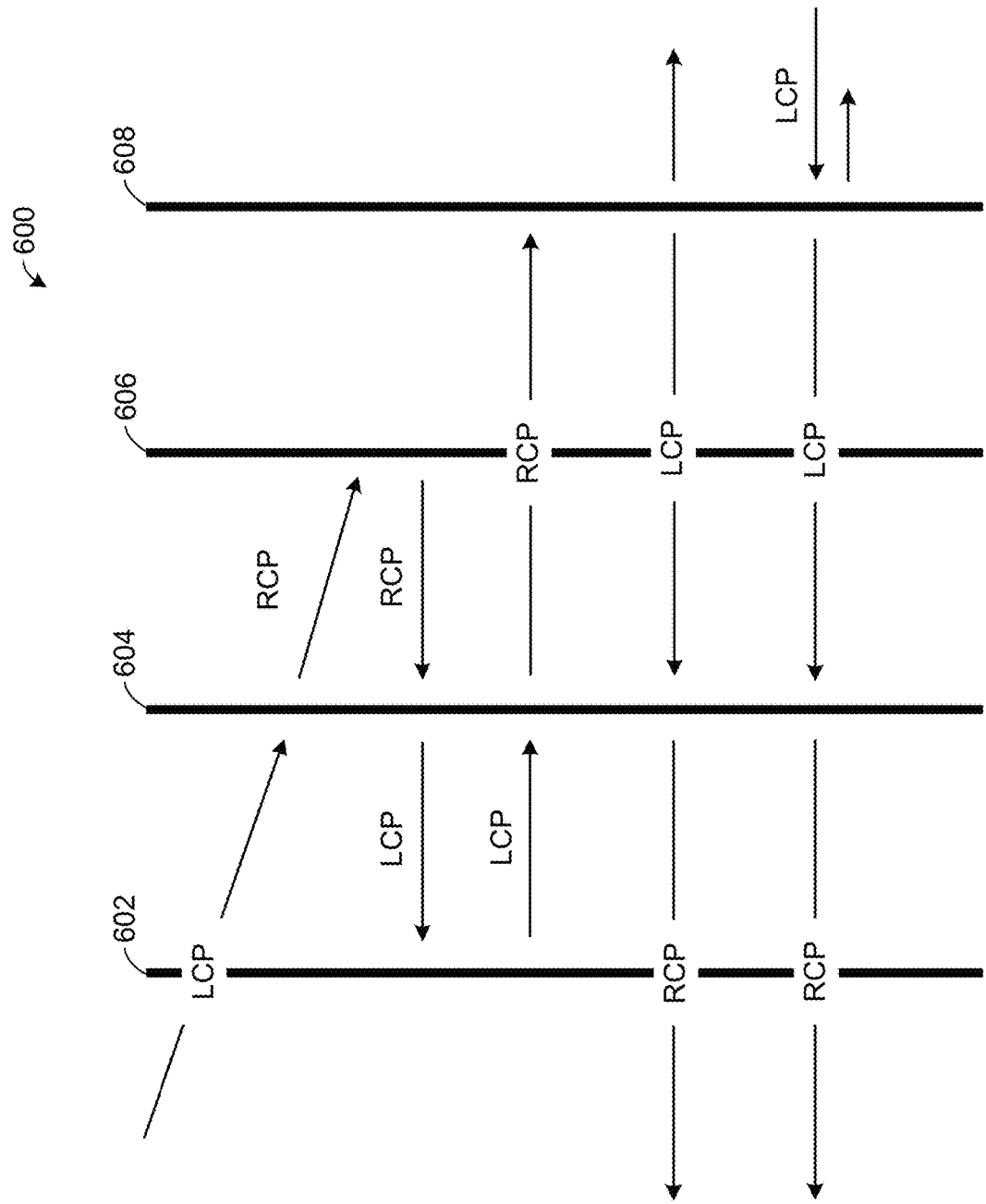
FIG. 7 is a ray-tracing diagram illustrating operation of a pancake lens that includes a diffuser, according to various embodiments.

FIG. 7 is a ray-tracing diagram illustrating operation of the pancake lens 600 that includes the diffuser 606, according to various embodiments. As shown, LPC light (from, e.g., the projection device 404 or 504) enters the pancake lens 600 at a slanted angle via the polarization- and angular-selective mirror 602. Illustratively, the polarization- and angular-selective mirror 602 is configured to allow through LCP light that is incident on the mirror 602 within a range of angles in some embodiments. In addition, the polarization- and angular-selective mirror 602 is configured to allow other light to pass through.

As shown, the LCP light that is incident on the polarization- and angular-selective mirror 602 at an angle passes through the mirror 602, which is configured to selectively allow through LCP light that is incident on the mirror 602 within a particular range of angles and RCP light that is incident on the mirror 602 at 0°, while reflecting LCP light that is incident on the mirror 602 at 0°. The LCP light that has passed through the polarization- and angular-selective mirror 602 is then incident on the half-wave plate 604, which converts the LCP light to RCP light.

As shown, the RCP light produced by the half-wave plate 604 is incident on the diffuser 606 at a slanted angle. In some embodiments, the diffuser 606 is configured to diffuse or scatter such RCP light that is incident on the diffuser 606 within a range of angles. In addition, the diffuser 606 is configured to permit light that is LCP and/or incident on the diffuser 606 at other angles (e.g., 0 degrees) to pass through without being diffused, although some attenuation of the light may occur.

As shown, diffused light that is produced by the diffuser 606 is RCP and reflects off of the diffuser 606 at 0° while maintaining its handedness of polarization. The reflected RCP light passes through the half-wave plate 604 again, which converts the RCP light to LCP light. The LCP light is then incident on the polarization- and angular-selective mirror 602, which completes one bounce through the pancake lens 600.

A second bounce through the pancake lens 600 begins when the LCP light is reflected by the polarization- and angular-selective mirror 602 mirror 602. As shown, the polarization- and angular-selective mirror 602 maintains the handedness of the reflected light, which is LCP. The reflected LCP light passes through the half-wave plate 604 and is converted to RCP light. The RCP light then passes through the diffuser 606 again, while maintaining its handedness of polarization and not being diffused. Thereafter, the RCP light that has passed through the diffuser 606 is reflected by the half mirror 608.

As described, the half mirror 608 is a simple meta-mirror that does not maintain the handedness of reflected light. As shown, RCP light that is incident on the half mirror 608 is reflected as LCP light. In some embodiments, the half mirror 608 may be a concave half mirror with focal power that can be used to make imagery appear at a further distance. As shown, some light passes through the half mirror 608 and is lost to the outside. However, the percentage of light that is lost may be relatively small in embodiments (e.g., approximately one percent).

As shown, the LCP light that is reflected by the half mirror 608 passes through the diffuser 606 again, without being diffused, and is then converted by the half-wave plate 604 to RCP light. Thereafter, the RCP light passes through the mirror 602, which is configured to allow through such RCP light, and exits the pancake lens 600 towards an eyebox.

As further shown, real-world light that is LCP passes directly through the pancake lens 600. In operation, the half mirror 608 separates real-world light that is incident thereon into a LCP component that is passed through the half mirror 608 and a RCP component that is reflected by the half mirror 608. In some embodiments, a circular polarizer (not shown) may be used to selectively allow through a LCP component of real-world light before the LCP component is incident on the half mirror 608.

As shown, the LCP real-world light that has passed through the half mirror 608 passes through the diffuser 606, while maintaining its handedness of polarization and not being diffused. Thereafter, the LCP real-world light passes through the half-wave plate and is converted by the half-wave plate 624 to RCP light. The RCP light then passes through the mirror 602 and exits the pancake lens 600 towards an eyebox.

As described, a pancake lens that includes a diffuser is a more compact design than one in which the diffuser and the pancake lens are distinct. As a result, a system that requires a diffuser and a pancake lens (e.g., the peripheral display modules 402 or 502, or the foveated display systems 400 and or 500) can have a relatively compact construction. Such compactness can be beneficial for applications with a HMD or other devices where a small form factor and weight are considerations. In addition, the pancake lens 600 may produce relatively little cross-talk, due to the angular selectivity of the diffuser 606, or expected light reduction.

Although specific optical elements of the pancake lenses 600 are discussed herein as reference examples, in alternative embodiments any other technically-feasible types of optical elements that are capable of performing the functionalities of the optical elements disclosed herein may be used.

Foveal Display System with Switchable PBP Grating Stack

Figure 8:
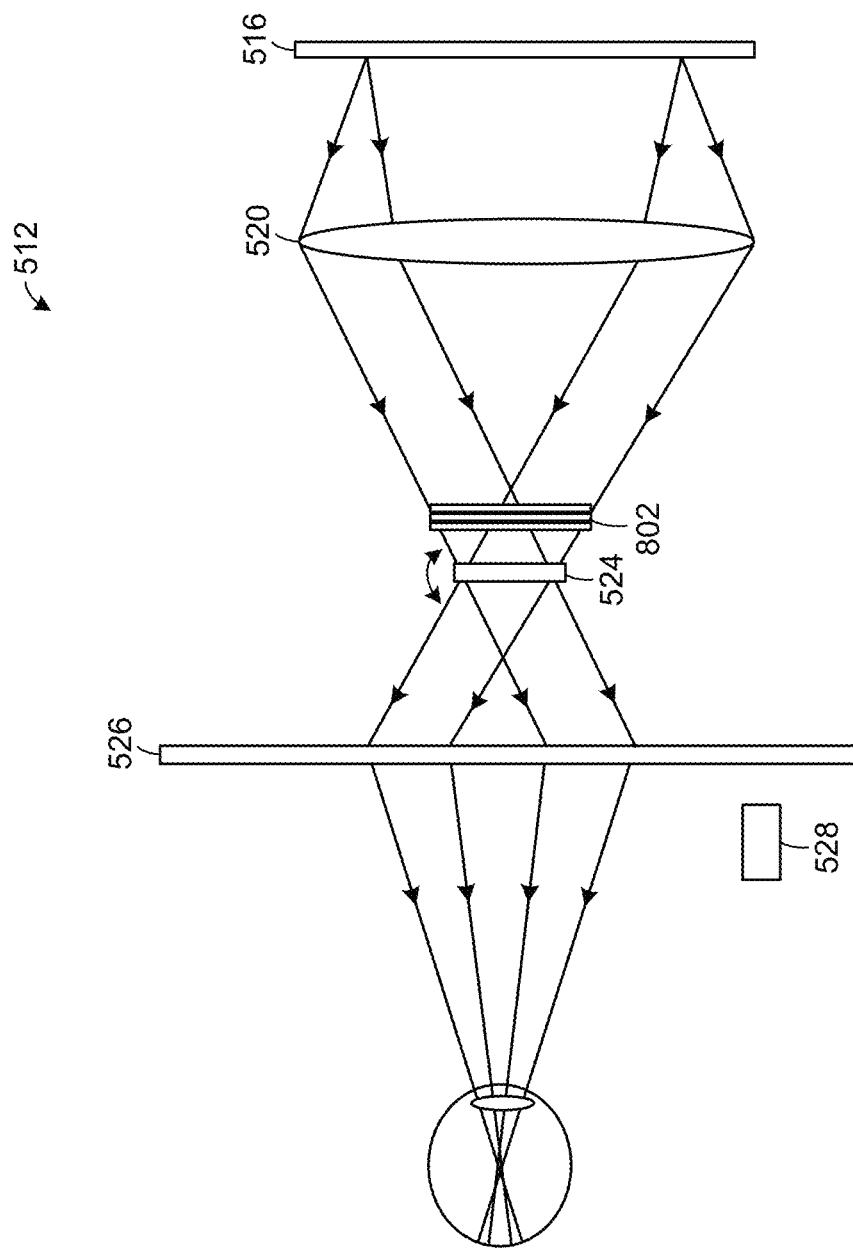
FIG. 8 is a schematic diagram illustrating an optical configuration of the foveal display module of FIG. 4, according to various embodiments.

FIG. 8 is a schematic diagram illustrating an optical configuration of components of the foveal display module 512 of FIG. 5, according to various embodiments. Although described with respect to the foveal display module 512 of FIG. 5 as an illustrative example, the optical configuration of FIG. 8 is also applicable to other foveal display systems such as the foveal display module 410 of FIG. 4.

As shown, the foveal display module 512 includes the SLM 516, the concave mirror 520, the MEMS mirror 524, and the HOE 526, which are described above in conjunction with FIG. 5. Although light is shown as passing through the MEMS mirror 524 for illustrative purposes, it should be understood that light is actually reflected by the MEMS mirror 524. As described, the SLM 516 included in the foveal display system provides a holographic display, and light from the holographic display can be focused on a foveal region of a user's eye gaze. In particular, responsive to detected changes in pupil position corresponding to the foveal region location, the MEMS mirror 524 can be controlled to steer light from the holographic display at particular angle(s). In particular, the MEMS mirrors 420 may steer most light rays from the holographic display such that those light rays reflect off of the HOE 526 and pass through the detected pupil position. As a result, the foveal display module 512 can generate appropriate gaze-direction views.

As shown, the foveal display module 512 further includes an optional switchable PBP grating stack 802. The switchable PBP grating stack 802 is disposed before the MEMS mirror 524 in the light path. The switchable PBP grating stack 802 is configured to extend the steering range of the MEMS mirror 524. In some embodiments, the switchable PBP grating stack 802 may double the steering range of the MEMS mirror 524. For example, if the horizontal steering range of the MEMS mirror 524 is +/−15° without active PBP grating elements, then the horizontal steering range could be extended to +/−30° with active PBP elements. Assuming the vertical steering range is +/−10° without active PBP elements, then the overall dynamic field of view could be 75°×35°, with a diagonal of 79°. Although described herein for simplicity with respect to a switchable PBP stack that extends the steering range of the MEMS mirror 524 along one direction (e.g., horizontally), in some embodiments a foveal display module may also include another switchable PBP stack that extends the steering range of the MEMS mirror 524 along a perpendicular direction (e.g., vertically). Continuing the example from above, a vertical steering range of +/−10° could be doubled to +/−20° using such a switchable PBP stack that extends the vertical steering range.

Figure 9:
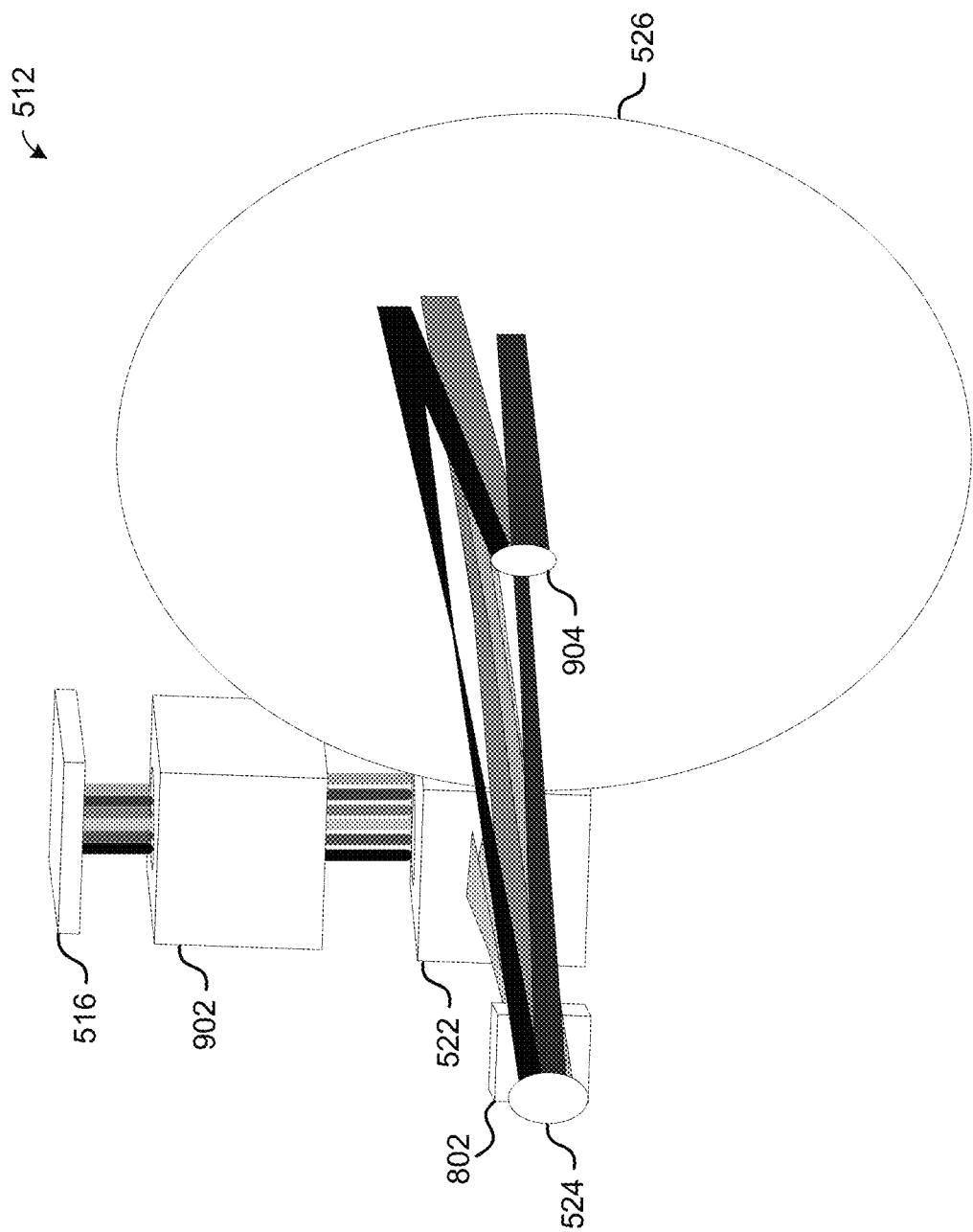
FIG. 9 illustrates in greater detail components of the foveal display module of FIG. 4, according to various embodiments.

FIG. 9 illustrates in greater detail components of the foveal display module 512, according to various embodiments. Although described with respect to the foveal display module 512 of FIG. 5 as an illustrative example, components shown in FIG. 9 may also be included in other foveal display systems such as the foveal display module 410 of FIG. 4.

As shown, the foveal display module 512 includes the SLM 516 that provides a holographic display. The foveal display module 512 further includes the beam splitter 506 that, together with another beam splitter 902 and a concave mirror (not shown), focus light from the SLM 516 towards the switchable PBP grating stack 802 and the MEMS mirror 524.

As shown, the switchable PBP grating stack 802 is disposed before the MEMS mirror 524 in the light path. In operation, the switchable PBP grating stack 802 and the MEMS mirror 524 are used to steer light, via the HOE 526, towards a pupil position corresponding to the foveal region of a user's eye gaze, which is shown as region 904 in FIG. 9. As shown, light is steered by the MEMS mirror 524 towards the HOE 526 at an angle that is determined based on pupil position (which is tracked by the eye tracker 528 the eye tracker 528). The steered light that is incident on the HOE 526 is reflected and focused by the HOE 526 towards the pupil 904, due to angular- and wavelength-selectivity characteristics of the HOE 526. Due to the same angular and wavelength selectivity characteristics, light for low-resolution, high FOV background imagery generated by the peripheral display module 502, as well as real-world light, may pass through the HOE 526.

Figure 10:
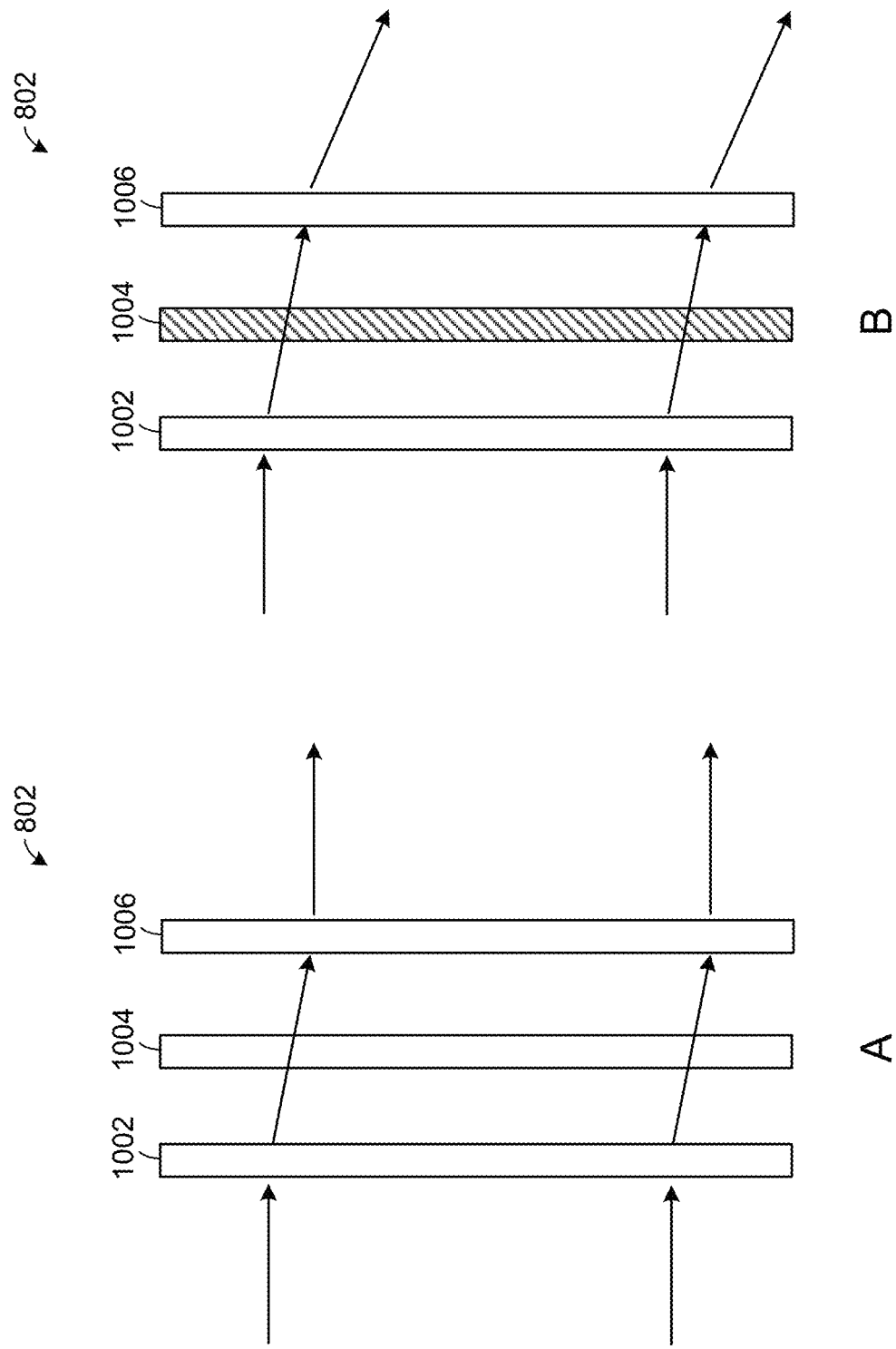
FIG. 10 illustrates components and operation of a switchable Pancharatnam-Berry phase (PBP) grating stack, according to various embodiments.

FIG. 10 illustrates components and operation of the switchable PBP grating stack 802 of FIG. 8, according to various embodiments. As shown in panel A, the switchable PBP grating stack 802 includes two PBP gratings 1002 and 1006, as well as a switchable half-wave plate 1004 that is disposed between the PBP gratings 1002 and 1006. All or some of the components of the switchable PBP grating stack 802 may be in physical contact with one another, share a substrate with one another, laminated with one another, optically in contact with one another, have index matching fluid or optical glue between one another, and/or may have space therebetween. For example, all or some of the some of the components of the PBP grating stack 802 could be the surfaces of lenses.

As discussed in greater detail below with respect to FIG. 11, each of the PBP gratings 1002 and 1006 has three possible states, depending on a handedness of polarization of light that is incident on the PBP grating 1002 or 1006 and the strength of an electric field that is applied (or not) to the PBP grating 1002 or 1006. The PBP gratings 1002 and 1006 diffract light differently in each of the three states. As a result, light that is incident on the PBP gratings 1002 and 1006 can be redirected at different angles depending the states that the PBP gratings 1002 and 1006 are in.

The switchable half-wave plate 1004 has two possible states, an on state and an off state. When the switchable half-wave plate 1004 is in the off state, the switchable half-wave plate 1004 allows light to pass through unimpeded. That is, the switchable half-wave plate 1004 acts like glass, without any characteristics, in the off state. In the on state, the switchable half-wave plate 1004 acts as a half-wave plate that retards one linear component of light relative to the other component by 180°. In the on state, the switchable half-wave plate 1004 converts LCP light that is incident thereon into RCP light, and vice versa.

As shown in panel A, the PBP gratings 1002 and 1006 are configured such that diffraction angles produced by the PBP gratings 1002 and 1006 cancel when the switchable half-wave plate 1004 is in the off state. As a result, the propagating direction of light passing through the switchable PBP grating stack 802 remains unchanged when the switchable half-wave plate 1004 (and the overall switchable PBP stack 802) is in the off state.

As shown in panel B, the PBP gratings 1002 and 1006 are further configured such that diffraction angles produced by the PBP gratings 1002 and 1006 add together when the switchable half-wave plate 1004 is in the on state. As a result, the propagating direction of light that passes through the switchable PBP grating stack 802 is changed when the switchable half-wave plate 1004 (and the overall switchable PBP stack 802) is in the on state.

The difference in diffraction angles between panels A and B is due to the different states of the PBP grating 1006, which is in turn caused by the different handedness of polarization of light output by the switchable half-wave plate 1004 when the switchable half-wave plate 1004 is in the on state versus the off state. As a result of the different diffraction angles, the switchable PBP grating stack 802 can be controlled to steer a beam of light incident thereon by turning the switchable half-wave plate 1004 (and the overall switchable PBP stack 802) on or off, as appropriate. Further, the steering range provided by the switchable PBP grating stack 802 can be used to increase the steering range of a beam-steering device such as the MEMS mirror 524 (by, e.g., a factor of 2), as described above in conjunction with FIGS. 8-9.

Although specific optical elements of the PBP grating stack 800 are discussed herein as reference examples, in alternative embodiments any other technically-feasible types of optical elements that are capable of performing the functionalities of the optical elements disclosed herein may be used.

Figure 11:
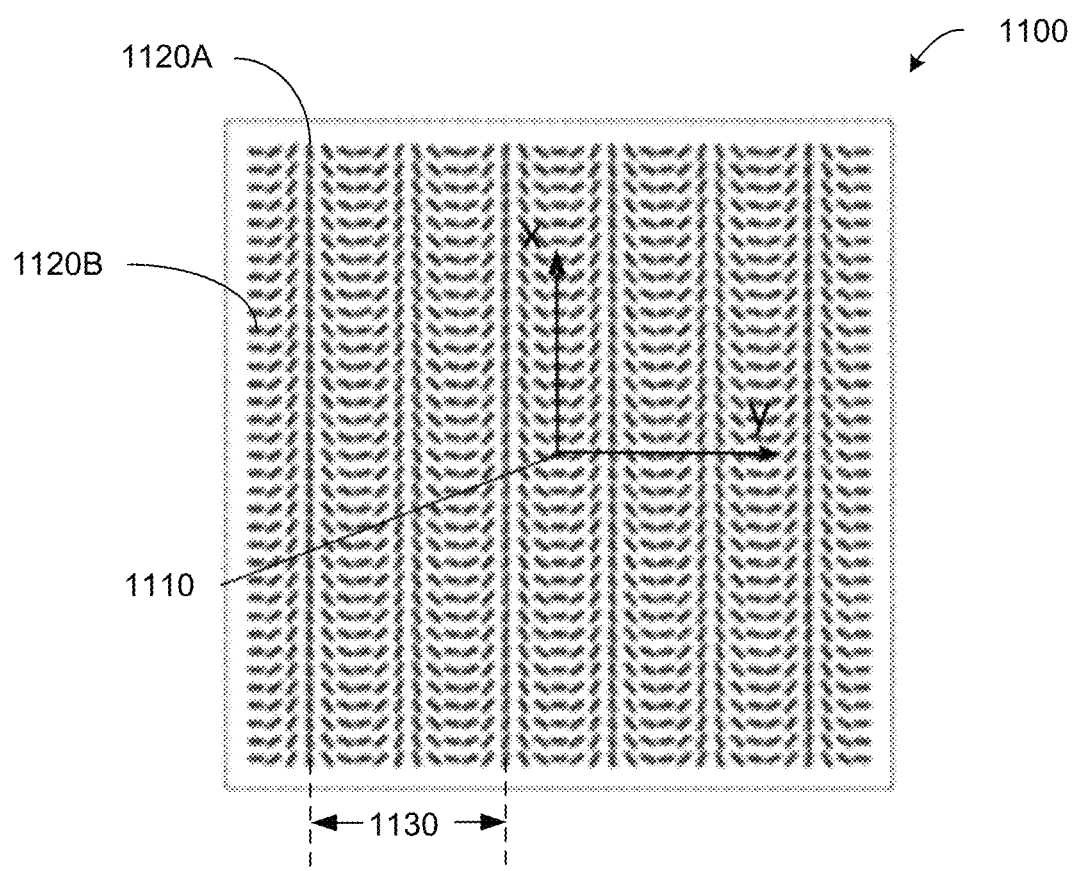
FIG. 11 illustrates a PBP grating, according to various embodiments.

FIG. 11 illustrates a PBP grating 1100, according to various embodiments. In some embodiments, the PBP grating 1100 may be one of the PBP gratings 1002 and 1006 described above in conjunction with FIG. 8. Mutually orthogonal x and y-axes 1110 are illustrated for reference. The z-axis, not illustrated, is perpendicular to the x-y plane and along an optical axis of the grating 1100.

As shown, the grating 1100 includes uniaxial fast axis 1120 of LC or meta structure that are oriented in a linearly repetitive pattern. In FIG. 11, the orientations of the fast axes are illustrated as short line segments aligned so as to schematically represent orientations of the LCs or the meta structure. For example, the fast axis 1120A is oriented in the x-direction while LC 1120B is oriented in the y-direction. A fast axis between 1120A and 1120B are aligned along directions intermediate to the x and y-directions. The uniaxial waveplate having such a patterned orientation gives rise to a geometric-phase shift of light as a consequence of polarization evolution as light waves of the light propagate through the waveplate (e.g., phase plate). In various embodiments, orientations of the fast axis along the x-axis are constant for a particular x-y plane of the grating 1100. Further, though not illustrated, in various embodiments, orientations of the fast axis in a direction perpendicular to the x-y plane (the z-axis) may vary in a rotational fashion (e.g., a twisted structure).

The linearly repetitive pattern of the grating 1100 has a pitch that is half the distance 1130 along the y-axis between repeated portions of the pattern. The pitch determines, in part, the optical properties of the grating 1100. For example, polarized light incident along the optical axis on the grating 1100 results in a grating output comprising primary, conjugate, and leakage light respectively corresponding to diffraction orders m=+1, −1, and zero. Although m=+1 is herein considered to be the primary order and the conjugate order is considered to be the m=−1 order, the designation of the orders could be reversed or otherwise changed. The pitch determines the diffraction angles (e.g., beam-steering angles) of the light in the different diffraction orders. Generally, the smaller the pitch, the larger the angles for a given wavelength of light.

In some embodiments, a PBP grating, such as 1100, may be active (also referred to as an "active element") or passive (also referred to as a "passive element"). An active PBP grating, for example, has three optical states, similar to that of an active PBP lens: an additive state, a neutral state, and a subtractive state. In an additive state, the active PBP grating diffracts light of a particular wavelength to an angle that is positive relative to the diffraction angle of the subtractive state. In the subtractive state, the active PBP grating diffracts light at a particular wavelength to an angle that is negative relative to the positive angle of the additive state. On the other hand, in the neutral state, the PBP grating does not lead to a diffraction of light and does not affect the polarization of light passing through the active PBP grating.

The state of an active PBP grating may be determined by a handedness of polarization of light incident on the active PBP grating and a measure of the electric field applied to the active PBP grating. For example, in some embodiments, an active PBP grating operates in a subtractive state responsive to incident light with a right-handed circular polarization and an applied electric field of zero (or, more generally, below a threshold electric field). In some embodiments, the PBP grating operates in an additive state responsive to incident light with a left-handed circular polarization and an applied electric field of zero. In some embodiments, the PBP grating operates in a neutral state (regardless of polarization) responsive to an applied electric field. Liquid crystals with positive dielectric anisotropy may be aligned along an applied electric field direction. If the active PBP grating is in the additive or subtractive state, then light output from the active PBP grating has a handedness that is opposite the handedness of light input into the active PBP grating. If the active PBP grating is in the neutral state, then light output from the active PBP grating has the same handedness as the light input into the active PBP grating.

The state of a passive PBP grating is determined by a handedness of polarization of light incident on the passive PBP grating. For example, in some embodiments, a passive PBP grating operates in a subtractive state responsive to incident light with a right-handed circular polarization. In some embodiments, the passive PBP grating operates in an additive state responsive to incident light with a left-handed circular polarization. For the passive PBP grating in the additive or subtractive state, light output from the passive PBP grating has a handedness that is opposite the handedness of light input into the passive PBP grating.

Generating Artificial Reality Content Using a Foveated Display System

Figure 12:
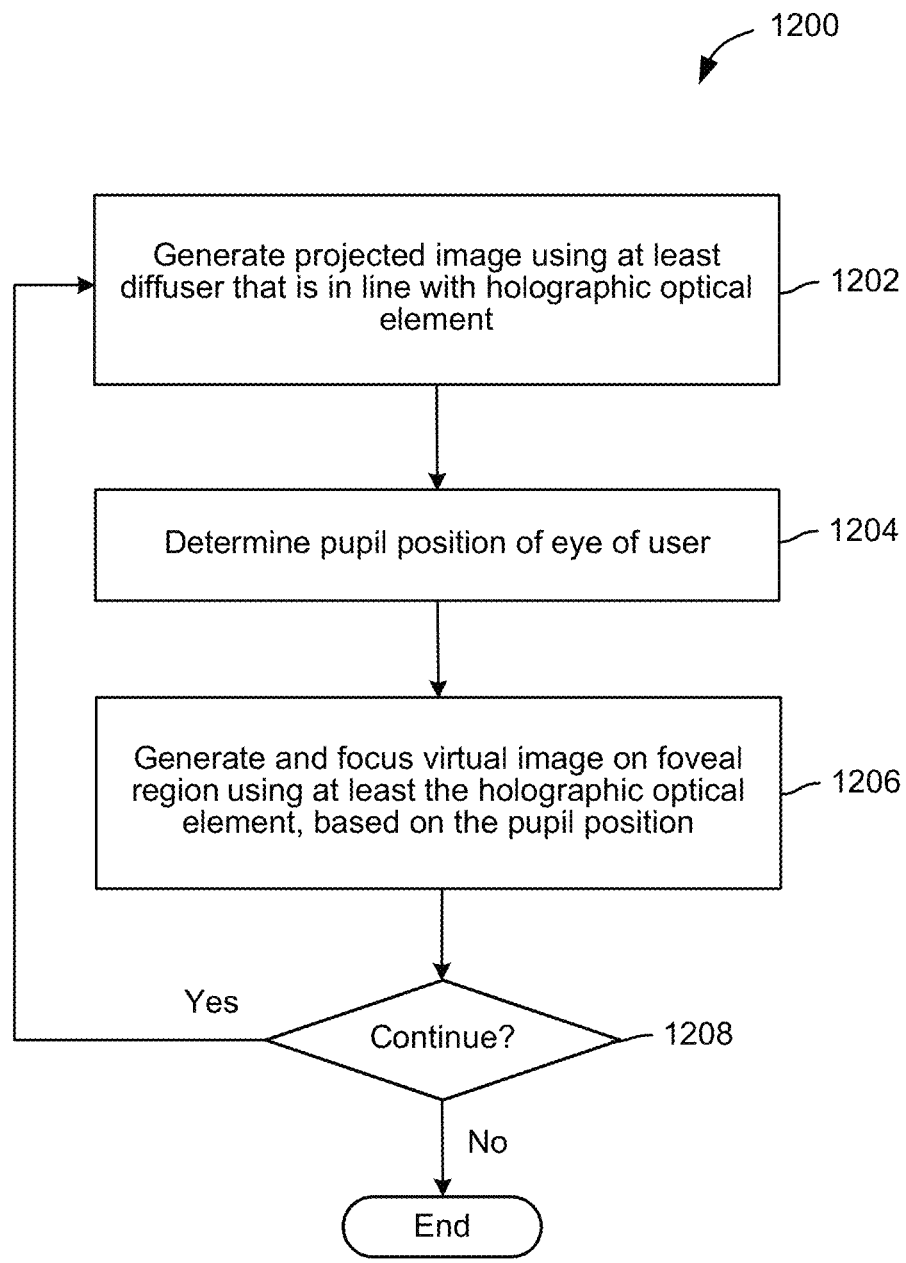
FIG. 12 illustrates a method for generating artificial reality content using a foveated display system, according to various embodiments.

FIG. 12 illustrates a method for generating artificial reality content using a foveated display system, according to various embodiments. Although the method steps are described with reference to the systems of FIGS. 1-3 and 5-11, persons skilled in the art will understand that any system may be configured to implement the method steps, in any order, in other embodiments. In particular, the method is described with reference to the foveated display system 500 of FIG. 5 as an illustrative example, but the method may also be implemented with other foveated display systems such as the foveated display system 400 of FIG. 4.

As shown, a method 1200 begins at block 1202, where an application causes a projected image to be generated using at least the diffuser 508 that is in line with the HOE 526. The application may be, e.g., one of the applications stored in the application store 355, which as described above in conjunction with FIG. 3 may include gaming applications, conferencing applications, video playback applications, or any other suitable applications. Although described with respect to such an application, in other embodiments some or all steps of the method 1200 may be performed by an engine such as the engine 365 described above in conjunction with FIG. 3.

As described above in conjunction with FIGS. 4-7, the diffuser 508 may be polarization, angular, and wavelength selective in some embodiments. In such cases, diffuser 508 may reflect and diffuse light having a particular handedness of polarization and within a particular range of wavelengths that is projected onto the diffuser 508 within a particular range of angles, while allowing other light (e.g., real-world light) to pass through the diffuser 508. As a result, the diffuser 508 may be used to generate a low-resolution, large FOV background image for non-foveal regions of a user's eye gaze. In some embodiments, the diffuser 508 may be included within a pancake lens, as described above in conjunction with FIGS. 6-7.

Figure 13:
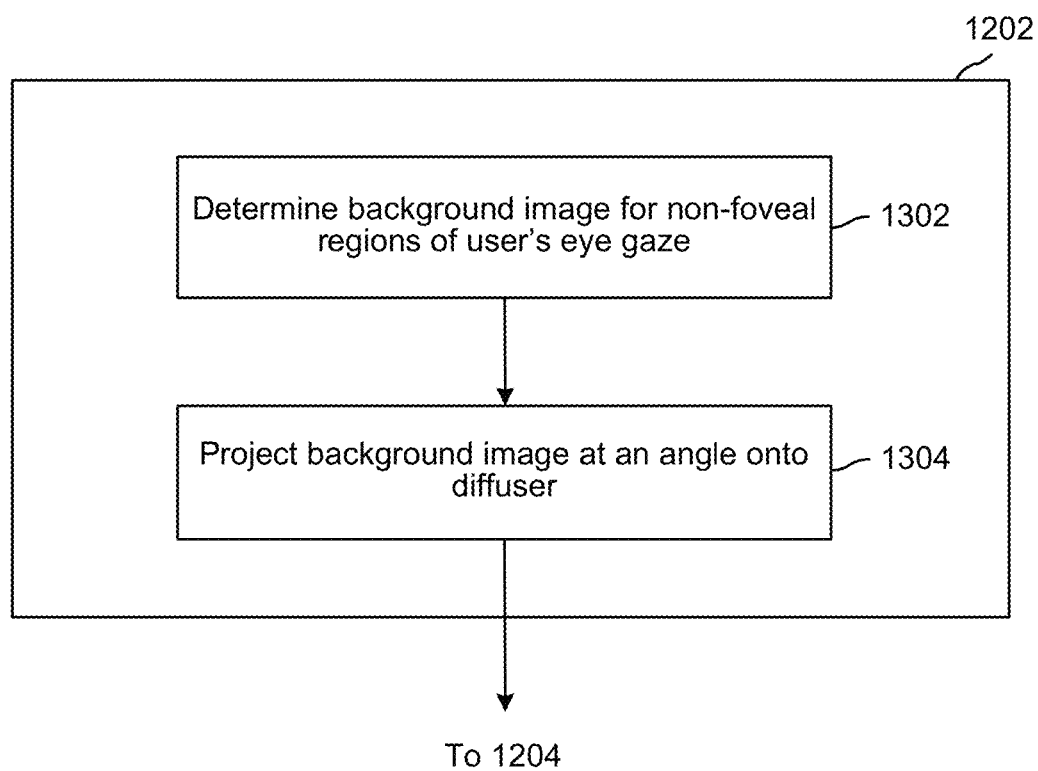
FIG. 13 illustrates in greater detail one of the steps of the method of FIG. 12, according to various embodiments.

FIG. 13 illustrates in greater detail block 1202 of the method 1200 of FIG. 12, according to various embodiments. Although the method steps are described with reference to the systems of FIGS. 5-7, persons skilled in the art will understand that any system may be configured to implement the method steps, in any order, in other embodiments. In particular, although described with reference to the foveated display system 500 of FIG. 5 as an illustrative example, the method steps may also be implemented with other foveated display systems such as the foveated display system 400 of FIG. 4.

At block 1302, the application determines a background image for the non-foveal regions of a user's eye gaze. As described, the non-foveal regions correspond to the peripheral vision of the user, so the background image that is determined at block 1304 need not be of the same resolution (i.e., pixel density) as a virtual image generated for a foveal region of the user's eye gaze. The background image that is determined at step 1302 may be any suitable image, and the particular image will generally depend on the application.

At block 1304, the application causes the background image to be projected at an angle onto the diffuser 508. In some embodiments, the diffuser may be included within a pancake lens that increases a propagating distance of light.

In other embodiments, the diffuser may be distinct from a pancake lens. As described, the diffuser may also be polarization, angular, and wavelength selective in some embodiments so as to reflect and diffuse light having a particular handedness of polarization and particular wavelengths that is projected at particular angles onto the diffuser, while allowing other light (e.g., real-world light) to pass through the diffuser.

Returning to FIG. 12, at block 1204, the application determines a pupil position of an eye of the user. In embodiments, any technically feasible eye-tracking technique(s) may be employed. For example, the application may analyze tracking data related to the user's eye that is generated using one or more illumination sources and an imaging device (camera) included in a NED or HMD that is worn by the user, as described above in conjunction with FIG. 3.

At block 1206, the application causes a virtual image to be generated and focused on a foveal region of a user's eye gaze using at least the HOE 526, based on the pupil position determined at block 1204. In some embodiments, a steering range of the MEMS mirror 524 that is used to focus light generated via the SLM 516 may further be increased using the switchable PBP grating stack 802, as described above in conjunction with FIGS. 7-8.

As described, the HOE 526 is an angular- and wavelength-selective lens that permits light associated with the projected image and generated at block 1202, as well as real-world light, to pass through the HOE 526. In addition, the HOE 526 is configured to reflect and focus light of particular wavelengths from the MEMS mirror 524 that is incident on the HOE 526 at particular angles towards a foveal region of a user's eye gaze, thereby generating high-resolution imagery.

Figure 14:
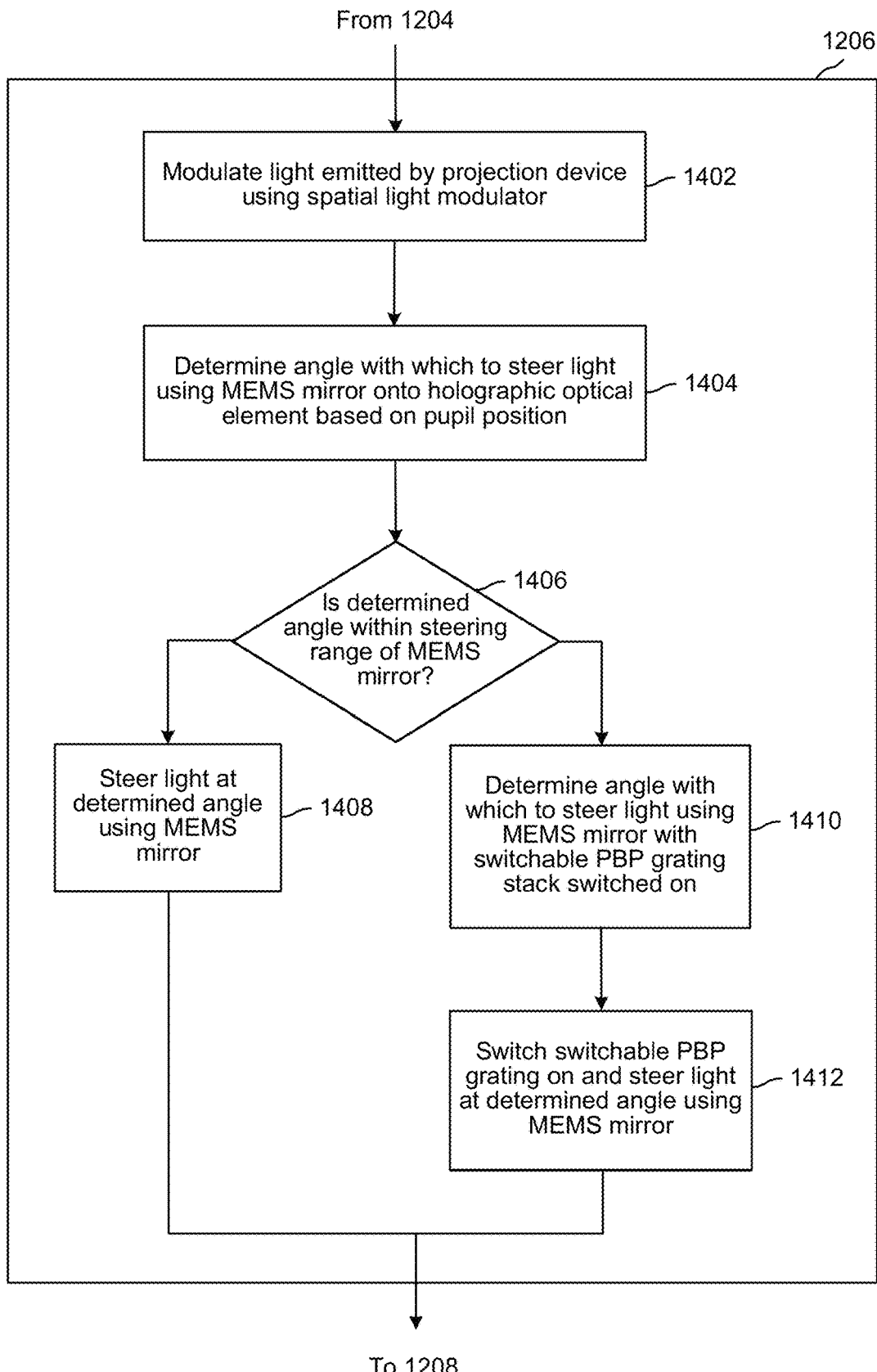
FIG. 14 illustrates in greater detail another of the steps of the method of FIG. 12, according to various embodiments.

FIG. 14 illustrates in greater detail block 1206 of the method 1200 of FIG. 12, according to various embodiments. Although the method steps are described with reference to the systems of FIGS. 5 and 8-11, persons skilled in the art will understand that any system may be configured to implement the method steps, in any order, in other embodiments. In particular, although described with reference to the foveated display system 500 of FIG. 5 as an illustrative example, the method steps may also be implemented with other foveated display systems such as the foveated display system 400 of FIG. 4.

As shown, at block 1402, the application causes the SLM 516 to modulate light emitted by the projection device 514. As described, in some embodiments, the SLM 516 may provide a holographic display that uses light diffraction to create a high-resolution virtual image that is focused on the foveal region of a user's eye gaze. In such cases, the application may determine modulation(s) to light emitted by the projection device 514 that are required to generate the high-resolution virtual imagery and control the SLM 516 accordingly. Any suitable modulations may be determined, and the particular modulations will generally depend on the application. In addition, light modulated by the SLM 516 may be focused onto the MEMS mirror 524 via the concave mirror 508 and one or more beam splitters (e.g., the beam splitters 506 and 902) in some embodiments.

As shown, at block 1404, the application determines an angle with which to steer light using the MEMS mirror 414 onto the HOE 526 based on the pupil position determined at block 1204 of the method 1200. As described, the determined angle is an angle necessary to focus light onto a foveal region of a user's eye gaze that corresponds to the determined pupil position.

At block 1406, the application determines whether the angle is within a steering range of the MEMS mirror 524. As described, a steering range of the MEMS mirror 524 may be limited by the tilt angle achievable by the MEMS mirror 524 in some embodiments. For example, a horizontal steering range of the MEMS mirror 524 could be limited to +/−15° without active PBP grating elements, and a vertical steering range of the MEMS mirror 524 could be limited to +/−10° without active PBP elements.

If the application determines that the angle is within the steering range of the MEMS mirror 524, then at block 1408, the application causes the MEMS mirror to steer light at the angle determined at block 1404. For example, the application could send a control signal to electromagnetically drive the MEMS mirror 524 based on the angle determined at block 1404. In this case, the switchable PBP grating stack 802 is not switched on (or is switched off if the switchable PBP grating stack 802 is already on).

If, on the other hand, the angle is not within the steering range of the MEMS mirror 524, then at block 1410, the application determines an angle with which to steer light onto the HOE 526 using the MEMS mirror 524 with the switchable PBP grating stack 802 switched on. For example, if the switchable PBP grating stack 802 is configured to double the steering range of the MEMS mirror 524, then the application could divide the angle determined at block 1404 by two at block 1410.

At block 1412, the application causes the switchable PBP grating stack 802 to be switched on and the MEMS mirror 524 to steer light at the angle determined at block 1410. As described, the switchable PBP grating stack 802 may be switched on by switching on the switchable half-wave plate 1004.

Returning to FIG. 12, at step 1208, the application determines whether to continue to another point in time. If the application determines to continue, then the method 1200 returns to step 1202, where the application causes another projected image to be generated using at least the diffuser 508 that is in line with the HOE 526. On the other hand, if the application determines not to continue, then the method 1200 ends.

One advantage of the foveated display systems disclosed herein is that the foveated display systems generate high-resolution virtual imagery for a foveal region of a user's eye gaze along with low-resolution, large field of view background imagery for other regions of the user's eye gaze. A diffuser that is used to generate the projected imagery can be disposed within a pancake lens, which is a relatively compact (i.e., thinner) design that is beneficial for applications with a HMD or other devices where a small form factor and weight are considerations. In addition, a switchable Pancharatnam-Berry phase grating stack can be used to increase the steering range of a beam-steering device used to generate the high-resolution virtual imagery such that, e.g., light associated with the virtual imagery can be steered to cover an entire field of view that is visible to the user's eye. These technical advantages represent one or more technological advancements over prior art approaches.

1. Some embodiments include a foveated display system comprising a foveal display module comprising a lens that is angular and wavelength selective, and a peripheral display module comprising a diffuser disposed in-line with the lens.

2. The foveated display system according to clause 1, wherein the diffuser is polarization, angular, and wavelength selective.

3. The foveated display system according to clauses 1 or 2, wherein the lens permits light output by the peripheral display module to pass through the lens.

4. The foveated display system according to any of clauses 1-3, wherein the peripheral display module further comprises a projection device configured to project light at an angle onto the diffuser, the diffuser is configured to diffuse the projected light, and the diffuser is further configured to permit real-world light to pass through the diffuser.

5. The foveated display system according to any of clauses 1-4, wherein the peripheral display module further comprises a pancake lens configured to increase a propagation distance of light that passes through the pancake lens.

6. The foveated display system according to any of clauses 1-5, wherein the diffuser is included within the pancake lens.

7. The foveated display system according to any of clauses 1-6, wherein the pancake lens further comprises a half-wave plate configured to change a handedness of polarization of light that passes through the half-wave plate, a mirror that is polarization and angular selective, and a half mirror configured to reflect and change a handedness of polarization of light incident thereon having one handedness of polarization, and pass through light incident thereon having another handedness of polarization.

8. The foveated display system according to any of clauses 1-7, wherein the foveal display module comprises an eye tracking module, a display, an optical element configured to focus light on a beam-steering mirror, wherein the beam-steering mirror is controllable to focus light, via the lens, toward a foveal region corresponding to a pupil position detected by the eye tracking module, and wherein the lens is configured to reflect light from the beam-steering mirror and to permit light that is output by the peripheral display module to pass through the lens.

9. The foveated display system according to any of clauses 1-8, wherein the foveal display module further comprises a switchable Pancharatnam-Berry phase (PBP) grating stack controllable to increase a steering range of the beam-steering mirror.

10. The foveated display system according to any of clauses 1-9, wherein the switchable PBP grating stack comprises two PBP gratings and a switchable half-wave plate disposed between the two PBP gratings.

11. The foveated display system according to any of clauses 1-10, wherein the lens is a holographic optical element.

12. The foveated display system according to any of clauses 1-11, wherein the lens is a volume grating lens.

13. The foveated display system according to any of clauses 1-12, wherein the diffuser comprises a cholesteric liquid crystal material.

14. Some embodiments include a head-mounted display (HMD) comprising a foveal display system disposed in series with a peripheral display system, wherein the foveal display system comprises a lens that is angular and wavelength selective, and wherein the peripheral display system comprises a diffuser.

15. The HMD of according to clause 14, wherein the diffuser is disposed in-line with the lens, and the diffuser is polarization and angular selective.

16. The HMD according to clauses 14 or 15, wherein the peripheral display system further comprises a projection device configured to project light onto the diffuser at an angle, wherein the diffuser is configured to diffuse the projected light and to permit real-world light to pass through the diffuser, and a pancake lens configured to increase a propagation distance of light that passes through the pancake lens, wherein the diffuser is included within the pancake lens.

17. The HMD according to any of clauses 14-16, wherein the foveal display system further comprises an eye tracking module, a display, and an optical element configured to focus light on a microelectro-mechanical system (MEMS) mirror, wherein the MEMS mirror is controllable to focus light, via the lens, toward a foveal region corresponding to a pupil position detected by the eye tracking module, and wherein the lens is configured to reflect light from the MEMS mirror and to permit light output by the peripheral display system to pass through the lens.

18. The HMD according to any of clauses 14-17, wherein the foveal display system further comprises a switchable Pancharatnam-Berry phase (PBP) grating stack controllable to increase a steering range of the MEMS mirror, and the switchable PBP grating stack comprises two PBP gratings and a switchable half-wave plate disposed between the two PBP gratings.

19. The HMD according to any of clauses 14-18, further comprising a combiner configured to combine real-world light and light generated by the peripheral display system.

20. Some embodiments include a method comprising detecting a pupil position of an eye of a user, generating a virtual image using at least a lens that is angular and wavelength selective, wherein the virtual image is focused via the lens towards a foveal region of the eye of the user corresponding to the detected pupil position, and generating a projected image using at least a diffuser disposed in-line with the lens, wherein the lens permits light associated with the projected image to pass through the lens.

Any and all combinations of any of the claim elements recited in any of the claims and/or any elements described in this application, in any fashion, fall within the contemplated scope of the present disclosure and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations is apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A foveated display system, comprising:
   a foveal display module comprising a lens that is angular and wavelength selective, wherein the lens is configured to reflect and focus light that is within a first range of wavelengths and incident on the lens within a first range of angles, and wherein the lens is configured to allow light that is outside of the first range of wavelengths or incident on the lens outside of the first range of angles to pass through the lens; and
   a peripheral display module comprising:
      a diffuser disposed in-line with the lens, wherein the diffuser is configured to diffuse light projected within the peripheral display module; and
      an optical element configured to increase a propagation distance of the light diffused by the diffuser.

2. The foveated display system of claim 1, wherein the diffuser is polarization, angular, and wavelength selective.

3. The foveated display system of claim 1, wherein the lens permits light output by the peripheral display module to pass through the lens.

4. The foveated display system of claim 1, wherein:
the peripheral display module further comprises a projection device configured to project the light projected within the peripheral display module at an angle onto the diffuser; and
the diffuser is further configured to permit real-world light to pass through the diffuser.

5. The foveated display system of claim 1, wherein the optical element configured to increase the propagation distance comprises a pancake lens configured to increase a propagation distance of light that passes through the pancake lens.

6. The foveated display system of claim 5, wherein the diffuser is included within the pancake lens.

7. The foveated display system of claim 6, wherein the pancake lens further comprises:
a half-wave plate configured to change a handedness of polarization of light that passes through the half-wave plate;
a mirror that is polarization and angular selective; and
a half mirror configured to:
reflect and change a handedness of polarization of light incident thereon having one handedness of polarization, and
pass through light incident thereon having another handedness of polarization.

8. The foveated display system of claim 1, wherein the foveal display module comprises:
an eye tracking module;
a display; and
an optical element configured to focus light on a beam-steering mirror,
wherein the beam-steering mirror is controllable to focus light, via the lens, toward a foveal region corresponding to a pupil position detected by the eye tracking module, and
wherein the lens is configured to reflect light from the beam-steering mirror and to permit light that is output by the peripheral display module to pass through the lens.

9. The foveated display system of claim 8, wherein the foveal display module further comprises a switchable Pancharatnam-Berry phase (PBP) grating stack controllable to increase a steering range of the beam-steering mirror.

10. The foveated display system of claim 9, wherein the switchable PBP grating stack comprises two PBP gratings and a switchable half-wave plate disposed between the two PBP gratings.

11. The foveated display system of claim 1, wherein the lens is a holographic optical element.

12. The foveated display system of claim 11, wherein the lens is a volume grating lens.

13. The foveated display system of claim 1, wherein the diffuser comprises a cholesteric liquid crystal material.

14. A head-mounted display (HMD), comprising:
a foveal display system disposed in series with a peripheral display system,
wherein the foveal display system comprises a lens that is angular and wavelength selective, wherein the lens is configured to reflect and focus light that is within a first range of wavelengths and incident on the lens within a first range of angles, and wherein the lens is configured to allow light that is outside of the first range of wavelengths or incident on the lens outside of the first range of angles to pass through the lens, and
wherein the peripheral display system comprises:
a diffuser configured to diffuse light projected within the peripheral display system; and
an optical element configured to increase a propagation distance of the light diffused by the diffuser.

15. The HMD of claim 14, wherein:
the diffuser is disposed in-line with the lens; and
the diffuser is polarization and angular selective.

16. The HMD of claim 14, wherein the peripheral display system further comprises:
a projection device configured to project the light projected within the peripheral display system onto the diffuser at an angle, wherein the diffuser is configured to permit real-world light to pass through the diffuser;
wherein the optical element configured to increase the propagation distance comprises a pancake lens configured to increase a propagation distance of light that passes through the pancake lens, and
wherein the diffuser is included within the pancake lens.

17. The HMD of claim 14, wherein the foveal display system further comprises:
an eye tracking module;
a display; and
an optical element configured to focus light on a micro-electro-mechanical system (MEMS) mirror,
wherein the MEMS mirror is controllable to focus light, via the lens, toward a foveal region corresponding to a pupil position detected by the eye tracking module, and
wherein the lens is configured to reflect light from the MEMS mirror and to permit light output by the peripheral display system to pass through the lens.

18. The HMD of claim 17, wherein:
the foveal display system further comprises a switchable Pancharatnam-Berry phase (PBP) grating stack controllable to increase a steering range of the MEMS mirror; and
the switchable PBP grating stack comprises two PBP gratings and a switchable half-wave plate disposed between the two PBP gratings.

19. The HMD of claim 13, further comprising a combiner configured to combine real-world light and light generated by the peripheral display system.

20. A method, comprising:
detecting a pupil position of an eye of a user;
generating a virtual image using at least a lens that is angular and wavelength selective, wherein the virtual image is focused via the lens towards a foveal region of the eye of the user corresponding to the detected pupil position, wherein the lens is configured to reflect and focus light that is within a first range of wavelengths and incident on the lens within a first range of angles, and wherein the lens is configured to allow light that is outside of the first range of wavelengths or incident on the lens outside of the first range of angles to pass through the lens; and
generating a projected image using at least a diffuser disposed in-line with the lens and an optical element, wherein the diffuser diffuses light associated with the projected image and the optical element increases a propagation distance of the diffused light associated with the projected image,
wherein the lens permits the light associated with the projected image to pass through the lens.

* * * * *